(12) United States Patent
Lango et al.

(10) Patent No.: US 7,689,609 B2
(45) Date of Patent: Mar. 30, 2010

(54) ARCHITECTURE FOR SUPPORTING SPARSE VOLUMES

(75) Inventors: Jason Ansel Lango, Mountain View, CA (US); Brian Mederic Quirion, San Jose, CA (US); Ling Zheng, Sunnyvale, CA (US); Robert Lieh-Yuan Tsai, Boston, MA (US); Matthew Benjamin Amdur, San Francisco, CA (US); Ram Kesavan, Santa Clara, CA (US); David Grunwald, Santa Clara, CA (US); Kartik Ayyar, Sunnyvale, CA (US); Robert M. English, Menlo Park, CA (US); J. Christopher Wagner, Langley, WA (US); Paul Eastham, Mountain View, CA (US); Emmanuel Ackaouy, Cambridge (GB); Ashish Prakash, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 200 days.

(21) Appl. No.: 11/409,624

(22) Filed: Apr. 24, 2006

(65) Prior Publication Data

US 2007/0250551 A1    Oct. 25, 2007

Related U.S. Application Data

(60) Provisional application No. 60/674,641, filed on Apr. 25, 2005.

(51) Int. Cl.
  *G06F 12/00* (2006.01)
(52) U.S. Cl. ............... 707/679; 707/204; 711/162
(58) Field of Classification Search ............... 707/1, 707/204, 201, 202; 711/161, 162; 714/15
  See application file for complete search history.

(56) References Cited

U.S. PATENT DOCUMENTS

| 4,408,273 | A | 10/1983 | Plow |
| 4,570,217 | A | 2/1986 | Allen et al. |
| 5,163,131 | A | 11/1992 | Row et al. |
| 5,202,979 | A | 4/1993 | Hillis et al. |
| 5,278,979 | A | 1/1994 | Foster et al. |
| 5,519,844 | A | 5/1996 | Stallmo |
| 5,535,381 | A | 7/1996 | Kopper |
| 5,568,455 | A | 10/1996 | Balsom |
| 5,819,292 | A | 10/1998 | Hitz et al. |

(Continued)

FOREIGN PATENT DOCUMENTS

EP    1349089 A2    1/2003

OTHER PUBLICATIONS

"Notification of Transmittal of the International Search Report and the Written Opinion of the International Searching Authroity, or the Declaration." PCT/US2006/015242 Apr. 24, 2006.

(Continued)

*Primary Examiner*—Isaac M Woo
*Assistant Examiner*—Amy Ng
(74) *Attorney, Agent, or Firm*—Cesari and McKenna, LLP

(57) ABSTRACT

An architecture, including a file-level protocol, for supporting sparse volumes on a storage system is provided. The file-level protocol provides coherency checking for use in retrieving data stored on a backing store remote from a storage system.

32 Claims, 23 Drawing Sheets

U.S. PATENT DOCUMENTS

| | | | |
|---|---|---|---|
| 5,978,792 | A | 11/1999 | Bhargava et al. |
| 6,229,806 | B1* | 5/2001 | Lockhart et al. ............ 370/389 |
| 6,493,718 | B1 | 12/2002 | Petculescu et al. |
| 6,513,051 | B1 | 1/2003 | Bolosky et al. |
| 6,574,618 | B2* | 6/2003 | Eylon et al. .................... 707/1 |
| 6,636,879 | B1 | 10/2003 | Doucette et al. |
| 6,643,654 | B1 | 11/2003 | Patel et al. |
| 6,804,690 | B1* | 10/2004 | Dysert et al. ............... 707/204 |
| 7,043,503 | B2 | 5/2006 | Haskin et al. |
| 7,194,579 | B2 | 3/2007 | Robinson et al. |
| 7,197,490 | B1 | 3/2007 | English |
| 2002/0083037 | A1 | 6/2002 | Lewis et al. |
| 2002/0194484 | A1 | 12/2002 | Bolosky et al. |
| 2003/0018878 | A1 | 1/2003 | Dorward et al. |
| 2003/0182301 | A1 | 9/2003 | Patterson et al. |
| 2003/0182389 | A1 | 9/2003 | Edwards |
| 2004/0030668 | A1 | 2/2004 | Pawlowski et al. |
| 2004/0030822 | A1 | 2/2004 | Rajan et al. |
| 2004/0117437 | A1 | 6/2004 | Frank |
| 2004/0186961 | A1 | 9/2004 | Kimura et al. |
| 2005/0021566 | A1* | 1/2005 | Mu ............................ 707/200 |
| 2005/0050110 | A1* | 3/2005 | Sawdon et al. ............. 707/201 |
| 2005/0114289 | A1 | 5/2005 | Fair |
| 2005/0114672 | A1* | 5/2005 | Duncan et al. ............. 713/182 |
| 2005/0154825 | A1 | 7/2005 | Fair |
| 2005/0246382 | A1 | 11/2005 | Edwards |
| 2005/0246401 | A1 | 11/2005 | Edwards et al. |
| 2006/0036676 | A1* | 2/2006 | Cardone et al. ............. 709/203 |
| 2006/0085471 | A1 | 4/2006 | Rajan et al. |
| 2006/0136418 | A1* | 6/2006 | Hudis et al. .................... 707/9 |
| 2006/0179261 | A1 | 8/2006 | Rajan |
| 2007/0088929 | A1* | 4/2007 | Hanai et al. ................. 711/165 |

OTHER PUBLICATIONS

"Beyond Backup Toward Storage Management" M. Kaczmarski et al. IBM Systems Journal, vol. 42, No. 2, 2003.

"Data Protection Strategies for Network Appliance Storage Systems." Nicholas Wilhelm-Olsen, et al. Apr. 25, 2003.

"Storage Virtualization—Definition Why, What, Where, and How?" Frank Burns, et al. Nov. 1, 2004.

"Improving Storage System Flexibility Through Virtual Allocation." Sukwoo Kang, et al. Dept. of Electrical Engineering, Texas A&M University, College Station, Texas.

U.S. Appl. No. 60/674,641, filed Apr. 25, 2005, Lango.

U.S. Appl. No. 60/674,611, filed Apr. 25, 2005, Lango.

U.S. Appl. No. 60/674,609, filed Apr. 25, 2005, Lango.

U.S. Appl. No. 60/674,430, filed Apr. 25, 2005, Lango.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109—Sep. 16, 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universl Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard et al., *Towards Self-Tuning Memory Management for Data Servers*, Data Engineering Journal 22, 2 1999 pp. 3-11.

Wet, Michael, et al. *The ITC Distributed File System: Prototype and Experience*, Carnegie-Mellon University, Technical Report CMU-ITC-040, Mar. 1985.

Zayas, Edward R. AFS-3 Programmer's Reference: Architectural Overview, Transarc Corporation, Pittsburgh, PA, 1.0 edition 1991.

\* cited by examiner

| FILE SYSTEM ID | 1205 |
|---|---|
| PCPI ID | 1210 |
| FILE ID | 1215 |
| GENERATION | 1220 |
| ⋮ | 1225 |

| BLOCKS | 1305 |
|---|---|
| SIZE | 1310 |
| TYPE | 1315 |
| SUB TYPE | 1320 |
| GENERATION | 1325 |
| UID | 1330 |
| GID | 1335 |
| CREATION TIME | 1340 |
| ⋮ | 1345 |

| PROTOCOL REQUEST DATA STRUCTURE | 1000 |
|---|---|
| FILE SYSTEM ID | 2005 |
| LOCK DEFAULT PCPI | 2010 |
| CHECK PCPI CONFIGURATION | 2015 |
| PCPI NAME LENGTH | 2020 |
| PCPI INFORMATION | 2025 |
| PCPI NAME | 2030 |
| ⋮ | 2035 |

| IDENTIFIER | 2105 |
|---|---|
| CP COUNT | 2110 |
| PCPI CREATION TIME (SECONDS) | 2115 |
| PCPI CREATION TIME (MICROSECONDS) | 2120 |
| ⋮ | 2125 |

| PROTOCOL RESPONSE DATA STRUCTURE | 1100 |
|---|---|
| PCPI INFORMATION | 2100 |
| BLOCKS USED | 2210 |
| BLOCKS_HOLES | 2215 |
| BLOCKS_OVERWRITE | 2220 |
| BLOCKS_HOLES_CIFS | 2225 |
| INODES USED | 2230 |
| TOTAL NO. OF INODES | 2235 |
| ⋮ | 2240 |

| PROTOCOL REQUEST DATA STRUCTURE | 1000 |
|---|---|
| FILE SYSTEM ID | 2305 |
| PCPI ID | 2310 |
| ⋮ | 2315 |

| PROTOCOL REQUEST DATA STRUCTURE | 1000 |
|---|---|
| LENGTH | 2405 |
| TYPE | 2410 |
| APPLICATION | 2415 |
| DATA | 2420 |
| ⋮ | 2425 |

| PROTOCOL RESPONSE DATA STRUCTURE | 1100 |
|---|---|
| STATUS | 2505 |
| DATA | 2510 |
| ⋮ | 2515 |

ARCHITECTURE FOR SUPPORTING SPARSE VOLUMES

CROSS-REFERENCE TO RELATED APPLICATIONS

The present application claims the benefit of U.S. Provisional Patent Application Ser. No. 60/674,641, which was filed on Apr. 25, 2005, by Jason Ansel Lango for a Architecture For Supporting Sparse Volumes and is hereby incorporated by reference.

RELATED APPLICATION

This application is related to U.S. patent application Ser. No. 11/409,887, entitled SYSTEM AND METHOD FOR SPARSE VOLUMES, by Jason Lango, et al, the contents of which are hereby incorporated by reference.

FIELD OF THE INVENTION

The present invention relates to file systems and, more specifically, to a protocol for use with a file system that includes volumes having one or more files with blocks that require a special operation to retrieve data associated therewith from a remote backing store.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configure to store striped data (i.e., data disks) and disks configure to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space. The file system, which controls the use and contents of blocks within the vbn space, organizes the data blocks within the vbn space as a "logical volume"; each logical volume may be, although is not necessarily, associated with its own file system. The file system typically consists of a contiguous range of vbns from zero to n-1, for a file system of size n blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may also opt to maintain a near optimal layout such that the data is substantially contiguously arranged on disks. The optimal disk layout results in efficient access operations, particularly for sequential read operations, directed to the disks. An example of a write-anywhere file system that is configure to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configure to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. It should be noted that a client request is typically directed to a specific file offset, which is then converted by the file system into a file block number (fbn), which represents an offset into a particular file. For example, if a file system is using 4 KB blocks, fbn 6 of a file represents a block of data starting 24 KB into the file and extending to 28 KB, where fbn 7 begins. The fbn is converted to an appropriate vbn by the file system. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume. Examples of the block allocation data structures are described in U.S. Patent Application Publication No. US2002/0083037 A1, titled Instant Snapshot, by Blake Lewis et al. and published on Jun. 27, 2002, which application is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk,dbn mappings.

During storage system operation, a volume (or other data container, such as a file or directory) may become corrupted due to, e.g., physical damage to the underlying storage devices, software errors in the storage operating system executing on the storage system or an improperly executing application program that modifies data in the volume. In such situations, an administrator may want to ensure that the volume is promptly mounted and exported so that it is accessible to clients as quickly as possible; this requires that the data in the volume (which may be substantial) be recovered as soon as possible. Often, the data in the volume may be recovered by, e.g., reconstructing the data using stored parity information if the storage devices are utilized in a RAID configuration. Here, reconstruction may occur "on-the-fly", resulting in virtually no discernable time where the data is not accessible.

In other situations, reconstruction of the data may not be possible. As a result, the administrator has several options, one of which is to initiate a direct copy of the volume from a point-in-time image stored on another storage system. In the general case, all volume data and metadata must be copied, prior to resuming normal operations, as a guarantee of application consistency. However, such "brute force" data copying is generally inefficient, as the time required to transfer substantial amounts of data, e.g., terabytes, may be on the order of days. Similar disadvantages are associated with restoring data from a tape device or other offline data storage. Another option that enables an administrator to rapidly mount and export a volume is to generate a hole-filled volume, wherein the contents of the volume are "holes". In this context, holes are manifested as entire blocks of zeros or other predefined pointer values stored within the buffer tree structure of a volume. An example of the use of such holes is described in the U.S. Pat. No. 7,457,982, issued on Jun. 27, 2008, entitled WRITABLE READ-ONLY SNAPSHOTS, by Vijayan Rajan, the contents of which are hereby incorporated by reference.

In such a hole-filled environment, the actual data is not retrieved from a backing store until requested by a client. However, a noted disadvantage of such a hole-based technique is that repeated write operations are needed to generate the appropriate number of zero-filled blocks on disk for the volume. That is, the use of holes to implement a data container that requires additional retrieval operations to retrieve data further requires that the entire buffer tree of a file and/or volume be written to disk during creation. The time required to perform the needed write operations may be substantial depending on the size of the volume or file. Thus, the creation of a hole-filled volume is oftentimes impractical due to the need for quick data access to a volume.

A storage environment in which there is typically a need to quickly "bring back" a volume involves the use of a near line storage server. As used herein, the term "near line storage server" means a secondary storage system adapted to store data forwarded from one or more primary storage systems, typically for long term archival purposes. The near line storage server may be utilized in such a storage environment to provide a back up of data storage (e.g., a volume) served by each primary storage system. As a result, the near line storage server is typically optimized to perform bulk data restore operations, but suffers reduced performance when serving individual client data access requests. This latter situation may arise where a primary storage system encounters a failure that damages its volume in such a manner that a client must send its data access requests to the server in order to access data in the volume. This situation also forces the clients to reconfigure with appropriate network addresses associated with the near line storage server to enable such data access.

SUMMARY OF THE INVENTION

The present invention overcomes the disadvantages of the prior art by providing a system and method for supporting a sparse volume within a file system of a storage system. As used herein, a sparse volume contains one or more files with at least one data block (i.e., an absent block) that is not stored locally on disk coupled to the storage system. By not storing the data block (or a block of zeros as in a hole environment), the sparse volume may be generated and exported quickly with minimal write operations required. The "missing" data of an absent block is stored on an alternate, possibly remote, source (e.g., a backing store) and is illustratively retrieved using a remote fetch operation.

A storage operating system executing on the storage system includes a novel NRV (NetApp Remote Volume) protocol module that implements an NRV protocol. The NRV protocol module interfaces with the file system to provide remote retrieval from the backing store. The NRV protocol module is invoked by an exemplary Load_Block() function within the file system that determines whether a block is to be retrieved from the remote backing store.

The Load_Block() function initiates a series of NRV protocol requests to the backing store to retrieve the data. The NRV protocol module first authenticates the connection and then transmits an initialization request to match the appropriate information required at the beginning of the connection. Once the NRV protocol connection has been initialized and authenticated, various types of data may be retrieved from the backing store including, for example, information relating to volumes, blocks and files or other data containers stored on the backing store. Additionally, the NRV protocol provides a mechanism to remotely lock a persistent consistency point image (PCPI) or snapshot (a lock PCPI request) on the backing store so that the backing store does not modify or delete the PCPI until it is unlocked via an unlock command (an unlock PCPI request). Such locking may be utilized when the backing store is instantiated within a PCPI that is required for a long-lived the application on the storage system, such as a restore on demand application. The novel NRV protocol also includes commands for retrieving status information such as volume information, from the backing store. This may be accomplished by sending a VOLINFO request to the backing store identifying the particular volume of interest

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 20 is a schematic block diagram of a lock PCPI (LOCK_PCPI) request data structure in accordance with an embodiment of the present convention;

FIG. 21 is a schematic block diagram of a PCPI information data structure in accordance with embodiment of the present convention;

FIG. 22 is a schematic block diagram of a lock PCPI (LOCK_PCPI) response data structure in accordance with an embodiment of the present convention;

FIG. 23 is a schematic block diagram of an unlock PCPI (UNLOCK_PCPI) request data structure in accordance with embodiment of the present convention;

FIG. 24 is a schematic block diagram of an authentication (AUTH) request data structure in accordance with embodiment of the present convention;

FIG. 25 is a schematic block diagram of an authentication (AUTH) response data structure in accordance with an embodiment of the present convention;

DETAILED DESCRIPTION OF AN ILLUSTRATIVE EMBODIMENT

A. Network Environment

Figure 1:
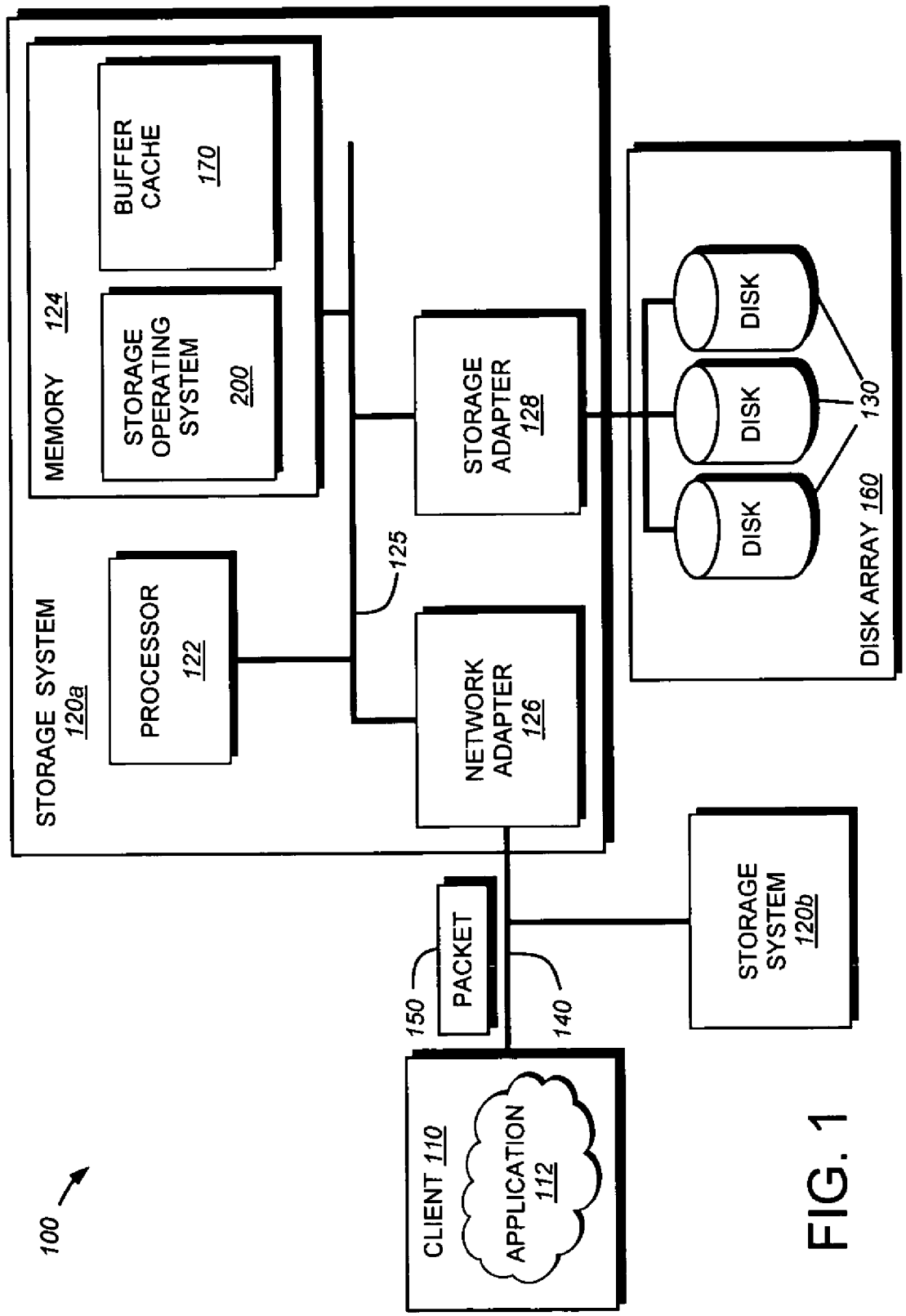
FIG. 1 is a schematic block diagram of an exemplary network environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the invention described herein.

The network adapter 126 comprises the mechanical, electrical and signaling circuitry needed to connect the storage system 120 to a client 110 over a computer network 140, which may comprise a point-to-point connection or a shared medium, such as a local area network (LAN) or wide area network (WAN). Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Additionally, a second storage system 120b is operatively interconnected with the network 140. The second storage system 120b may be configured as a remote backing store server or, illustratively, a near line storage server. The storage system 120b generally comprises hardware similar to storage system 120a; however, it may alternatively execute a modified storage operating system that adapts the storage system for use as a near line storage server. It should be noted that in alternate embodiments, multiple storage systems 120b may be utilized.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
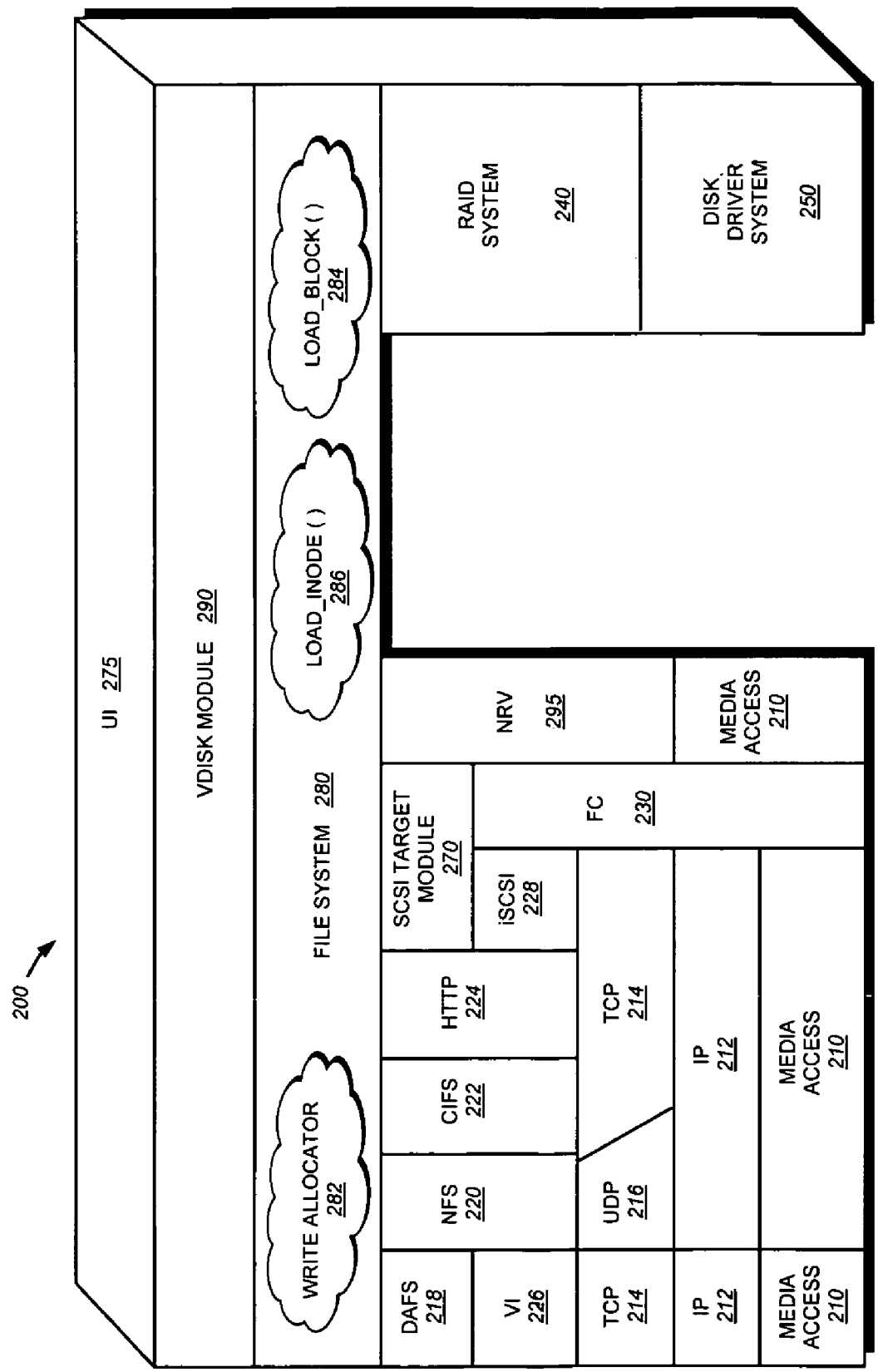
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol. The storage operating system 200 further comprises an NRV protocol layer 295 that interfaces with file system 280. The NRV protocol is generally utilized for remote fetching of data blocks that are not stored locally on disk. However, as described further below, the NRV protocol may be further utilized in storage appliance-to-storage appliance communication to fetch absent blocks in a sparse volume in accordance with the principles of the present invention.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. Illustratively this operation may be embodied as a Load_Block() function 284 of the file system 280. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

The file system 280 illustratively provides the Load_Block() function 284 to retrieve one or more blocks of data from disk. A block may be retrieved in response to a read request or may be retrieved in response to an exemplary read ahead algorithm. The illustrative Load_Block() function 284 attempts to load a requested block of data. The Load_Block() function 284 initiates transfer of a fetch operation to an appropriate backing store using the illustrative NRV protocol 295 if any blocks require data to be remotely retrieved. Once the data has been retrieved, the Load_Block() function 284 returns with the requested data. Sparse volumes and ABSENT block pointers are further described in the above-referenced U.S. Patent Application, entitled SYSTEM AND METHOD FOR SPARSE VOLUMES, by Jason Lango et al. It should be noted that the use of the NRV protocol for remote retrieval of data for sparse volumes is exemplary and that the novel NRV protocol described herein may be utilized for other types of remote data retrieval. As such, the illustrative embodiment of utilizing the NRV protocol for retrieving sparse volumes data should be taken as exemplary only and should not limit the scope of the present invention.

Additionally, in the illustrative embodiment, the file system 280 provides a Load_Inode() function 286 to retrieve an inode from disk. In the illustrative embodiment, the Load_Inode() function 286 is adopted to obtain appropriate file geometry information, as described further below. In the illustrative embodiment, a sparse configuration metadata file is stored on the storage system. The sparse configuration metadata file includes appropriate configuration information to enable data retrieval from a backing store. Such information may include identification information of the remote backing store along with an identification of what data container(s) on the backing store are to be utilized as the backing store. In the illustrative embodiment, a sparse volume may be supported by a plurality of backing stores.

It should be further noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configure to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configure for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. Patent Publication No. 2004/0030668, published Feb. 12, 2004 titled MULTI-PROTOCOL STORAGE APPLIANCE THAT PROVIDES INTEGRATED SUPPORT FOR FILE AND BLOCK ACCESS PROTOCOLS by Pawlowski et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
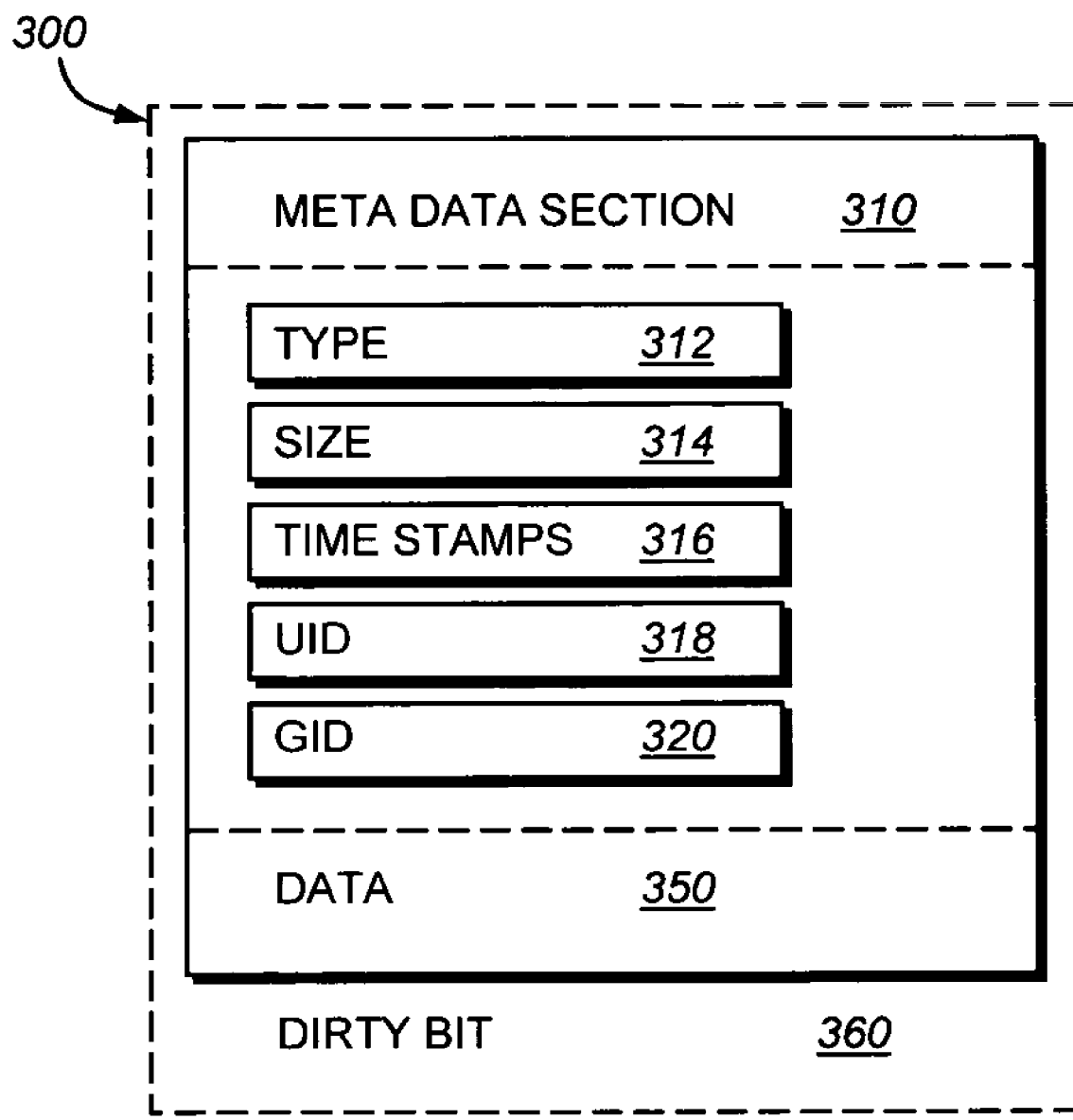
FIG. 3 is a schematic block diagram of an exemplary inode in accordance with an embodiment of the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kilobyte (KB) data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
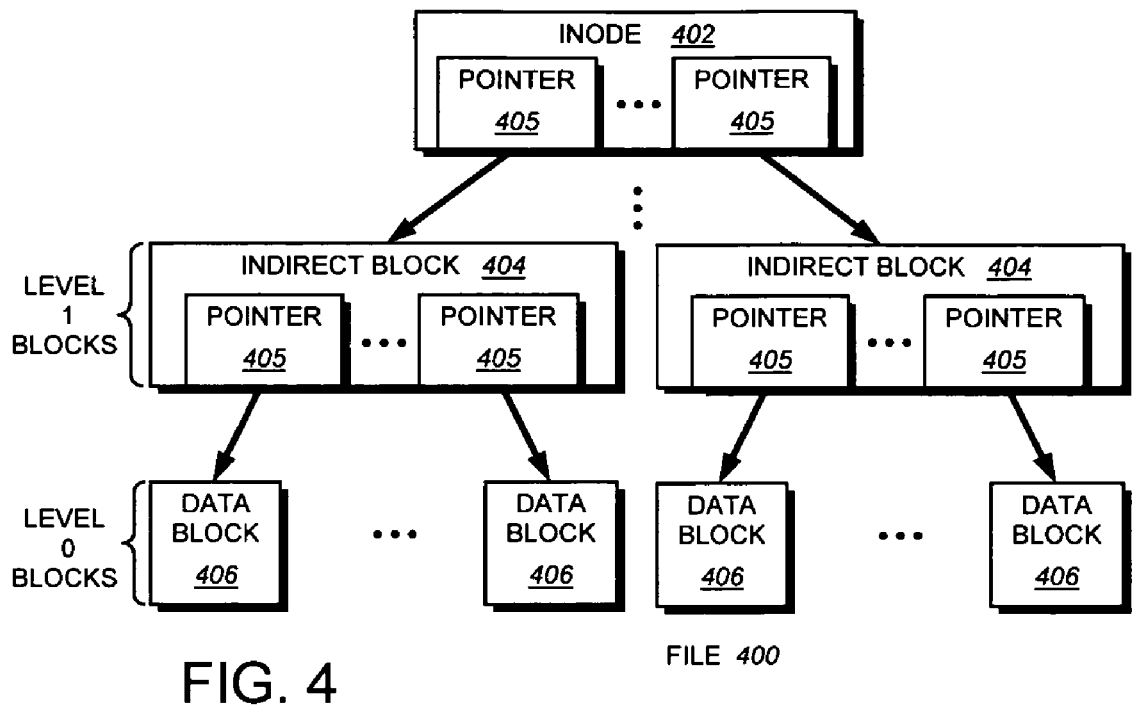
FIG. 4 is a schematic block diagram of an exemplary buffer tree in accordance with an embodiment of the present invention.

FIG. 4 is a schematic block diagram of an embodiment of a buffer tree of a file that may be advantageously used with the present invention. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system. An example of such a file system layout is described in U.S. Pat. No. 7,409,494, issued on Aug. 5, 2008, titled EXTENSION OF WRITE ANYWHERE FILE SYSTEM LAYOUT, by John K. Edwards et al. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 400) stored in a vvol. This "hybrid" vvol embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, "points to" an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

Figure 5:
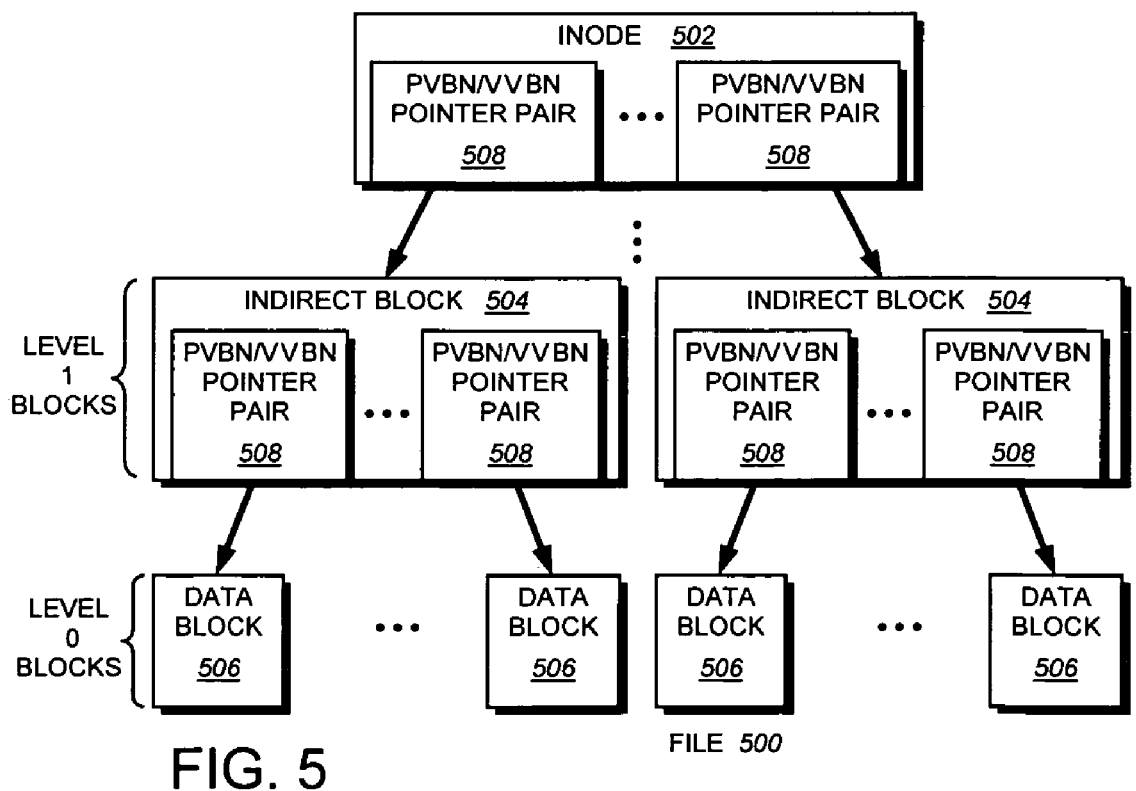
FIG. 5 is a schematic block diagram of an illustrative embodiment of a buffer tree of a file that may be advantageously used with the present invention.

In an illustrative "dual vbn" hybrid ("flexible") vvol embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the vvol. The use of pvbns as block pointers 508 in the indirect blocks 504 provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

As noted, each inode has 64 bytes in its data section that, depending upon the size of the inode file (e.g., greater than 64 bytes of data), function as block pointers to other blocks. For traditional and hybrid volumes, those 64 bytes are embodied as 16 block pointers, i.e., sixteen (16) 4 byte block pointers. For the illustrative dual vbn flexible volume, the 64 bytes of an inode are embodied as eight (8) pairs of 4 byte block pointers, wherein each pair is a vvbn/pvbn pair. In addition, each indirect block of a traditional or hybrid volume may contain up to 1024 (pvbn) pointers; each indirect block of a dual vbn flexible volume, however, has a maximum of 510 (pvbn/vvbn) pairs of pointers.

Moreover, one or more of pointers 508 may contain a special ABSENT value to signify that the object(s) (e.g., an indirect block or data block) referenced by the pointer(s) is not locally stored (e.g., on the volume) and, thus, must be fetched (retrieved) from an alternate backing store. In the illustrative embodiment, the Load_Block() function interprets the content of the each pointer and, if a requested block is ABSENT, initiates transmission of an appropriate request (e.g., a remote fetch operation) for the data to a backing store using, e.g. the novel NRV protocol of the present invention.

Figure 6:
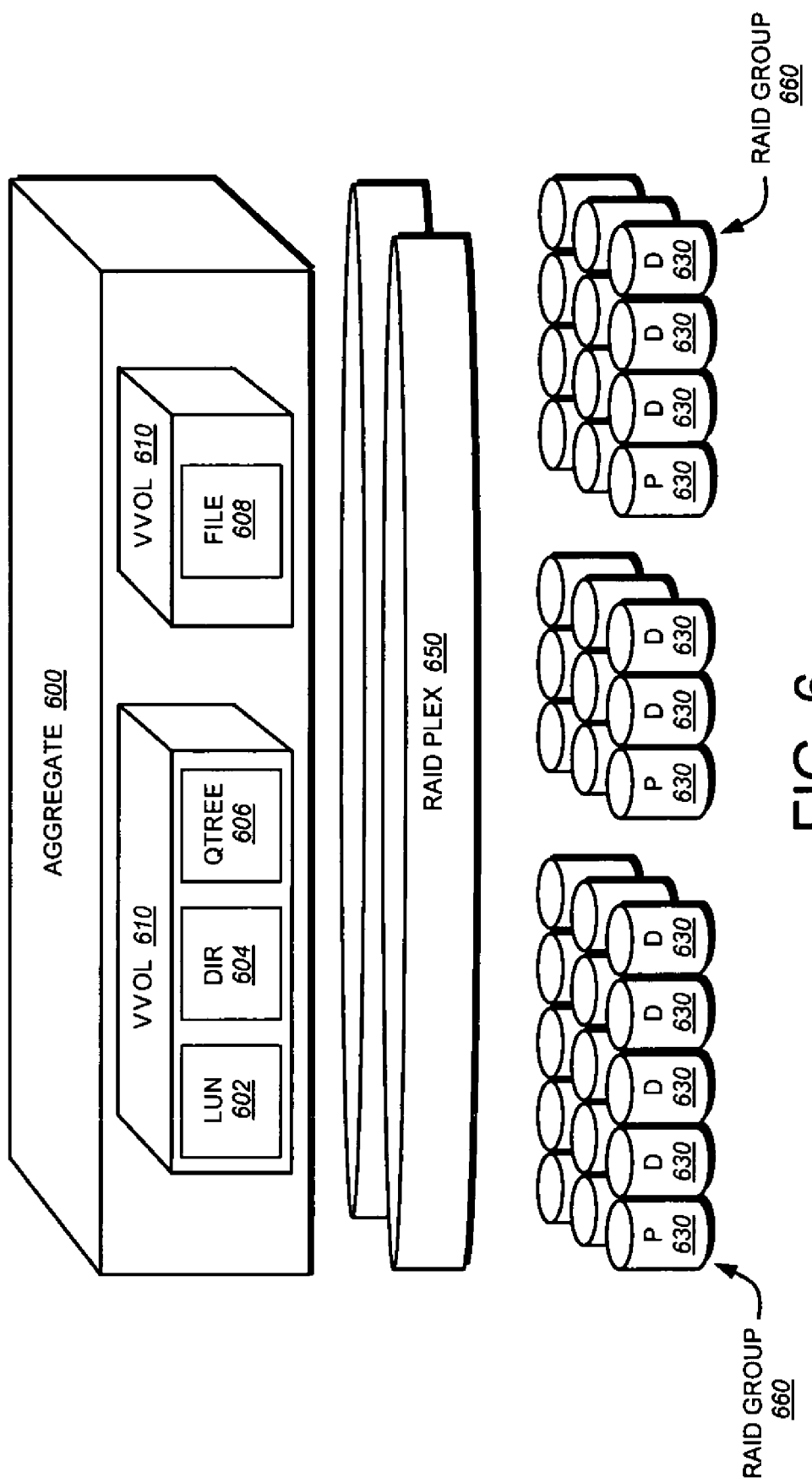
FIG. 6 is a schematic block diagram of an exemplary aggregate in accordance with an embodiment of the present invention.

FIG. 6 is a schematic block diagram of an embodiment of an aggregate 600 that may be advantageously used with the present invention. Luns (blocks) 602, directories 604, qtrees 606 and files 608 may be contained within vvols 610, such as dual vbn flexible vvols, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a vvol is analogous to a file within that physical volume. That is, the aggregate 600 may include one or more files, wherein each file contains a vvol 610 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 610 is also a logical volume, it has its own block allocation structures (e.g., active, space and summary maps) in its vvbn space.

A container file is a file in the aggregate that contains all blocks used by a vvol. The container file is an internal (to the aggregate) feature that supports a vvol; illustratively, there is one container file per vvol. Similar to a pure logical volume in a file approach, the container file is a hidden file (not accessible to a user) in the aggregate that holds every block in use by the vvol. The aggregate includes an illustrative hidden meta-data root directory that contains subdirectories of vvols:

WAFL/fsid/filesystem file, storage label file

Specifically, a "physical" file system (WAFL) directory includes a subdirectory for each vvol in the aggregate, with the name of subdirectory being a file system identifier (fsid) of the vvol. Each fsid subdirectory (vvol) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

Figure 7:
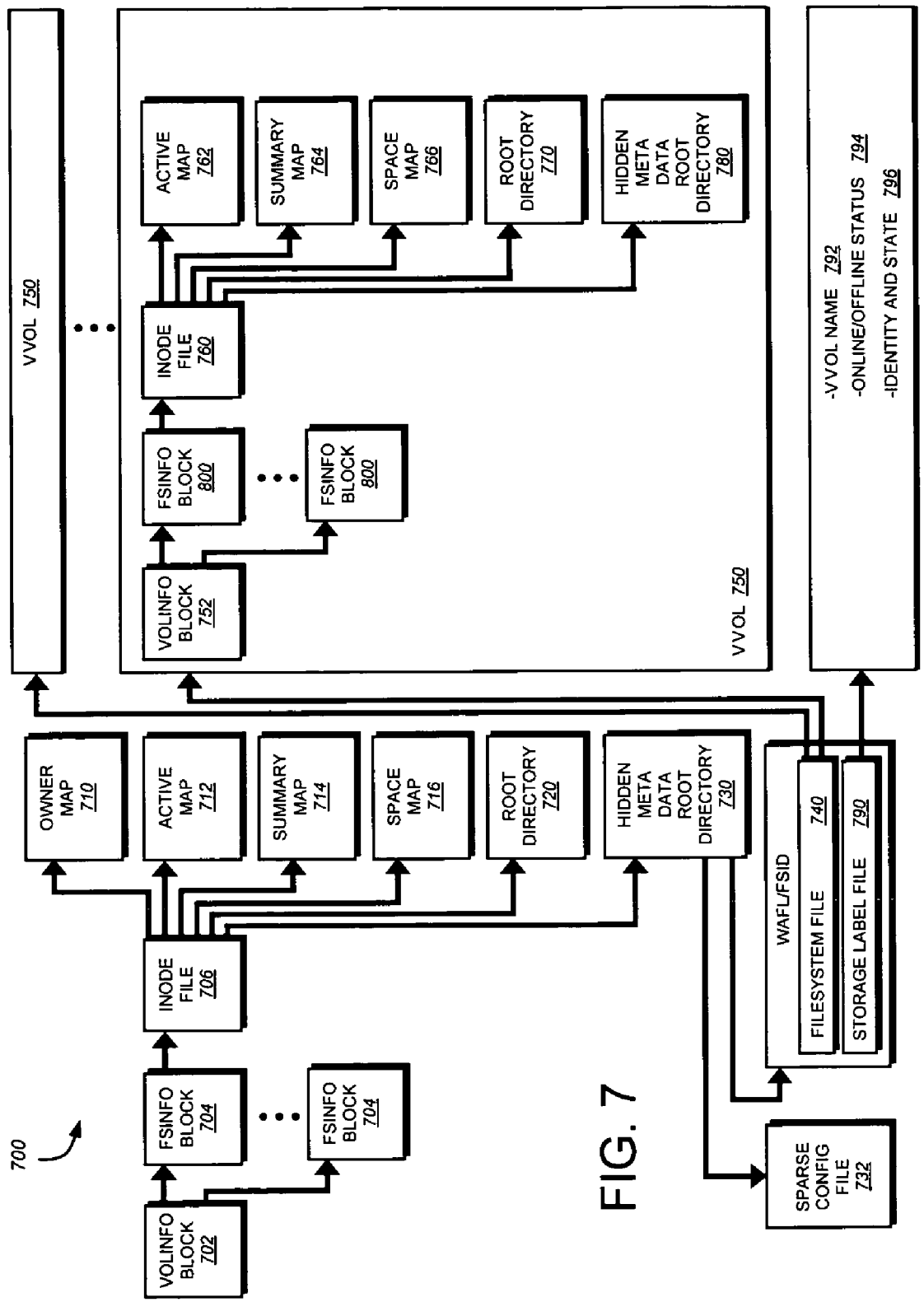
FIG. 7 is a schematic block diagram of an exemplary on-disk layout in accordance with an embodiment of the present invention.

FIG. 7 is a schematic block diagram of an on-disk representation of an aggregate 700. The storage operating system 200, e.g., the RAID system 240, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special metadata files. The inode file 706 further includes a root directory 720 and a "hidden" metadata root directory 730, the latter of which includes a namespace having files related to a vvol in which users cannot "see" the files. The hidden metadata root directory also includes the WAFL/fsid/directory structure that contains filesystem file 740 and storage label file 790. Note that root directory 720 in the aggregate is empty; all files related to the aggregate are organized within the hidden metadata root directory 730. The hidden metadata root directory 730 also illustratively includes a sparse configuration file 732 that contains appropriate configuration metadata for use with a sparse volume. Such metadata includes, e.g., the identification of the backing store associated with a particular sparse volume.

In addition to being embodied as a container file having level 1 blocks organized as a container map, the filesystem file 740 includes block pointers that reference various file systems embodied as vvols 750. The aggregate 700 maintains these vvols 750 at special reserved inode numbers. Each vvol 750 also has special reserved inode numbers within its vvol space that are used for, among other things, the block allocation bitmap structures. As noted, the block allocation bitmap structures, e.g., active map 762, summary map 764 and space map 766, are located in each vvol.

Specifically, each vvol 750 has the same inode file structure/content as the aggregate, with the exception that there is no owner map and no WAFL/fsid/filesystem file, storage label file directory structure in a hidden metadata root directory 780. To that end, each vvol 750 has a volinfo block 752 that points to one or more fsinfo blocks 800, each of which may represent a snapshot, along with the active file system of the vvol. Each fsinfo block, in turn, points to an inode file 760 that, as noted, has the same inode structure/content as the aggregate with the exceptions noted above. Each vvol 750 has its own inode file 760 and distinct inode space with corresponding inode numbers, as well as its own root (fsid) directory 770 and subdirectories of files that can be exported separately from other vvols.

The storage label file 790 contained within the hidden metadata root directory 730 of the aggregate is a small file that functions as an analog to a conventional raid label. A raid label includes "physical" information about the storage system, such as the volume name; that information is loaded into the storage label file 790. Illustratively, the storage label file 790 includes the name 792 of the associated vvol 750, the online/offline status 794 of the vvol, and other identity and state information 796 of the associated vvol (whether it is in the process of being created or destroyed).

Figure 8:
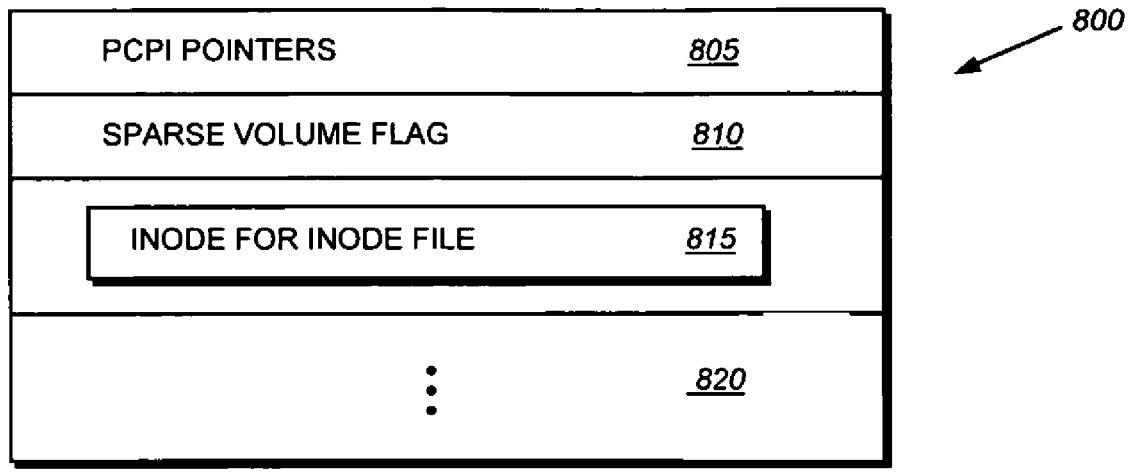
FIG. 8 is a schematic block diagram of an exemplary fsinfo block in accordance with an embodiment of the present invention.

A sparse volume is identified by a special marking of an on-disk structure of the volume (vvol) to denote the inclusion of a file with an absent block. FIG. 8 is a schematic block diagram of the on-disk structure, which illustratively is an exemplary fsinfo block 800. The fsinfo block 800 includes a set of PCPI pointers 805, a sparse volume flag field 810, an inode for the inode file 815 and, in alternate embodiments, additional fields 820. The PCIP pointers 805 are "dual vbn" (vvbn/pvbn) pairs of pointers to PCPIs associated with the file system. The sparse volume flag field 810 identifies whether the vvol described by the fsinfo block is sparse. In the illustrative embodiment, a flag is asserted in field 810 to identify the volume as sparse. The sparse volume flag field 810 may be embodied as a type field identifying the type of a vvol associated with the fsinfo block. The inode for the inode file 815 includes the inode containing the root-level pointers to the inode file 760 (FIG. 7) of the file system associated with the fsinfo block.

Appropriate block pointer(s) of the file are marked (labeled) with special ABSENT value(s) to identify that certain block(s), including data and/or indirect blocks, within the sparse volume are not physically located on the storage system serving the volume. The special value further alerts the file system that the data is to be obtained from the alternate source, namely a remote backing store, which is illustratively near line storage server 120b. In response to a data access request, the Load_Block() function 284 of the file system 280 detects whether an appropriate block pointer of a file is marked as is ABSENT and, if so, transmits a remote fetch (e.g., read) operation from the storage system to the remote backing store to fetch the required data. The fetch operation illustratively requests one or more file block numbers of the file stored on the backing store.

The backing store retrieves the requested data from its storage devices and returns the requested data to the storage system, which processes the data access request and stores the returned data in its memory. Subsequently, the file system "flushes" (writes) the data stored in memory to local disk during a write allocation procedure. In accordance with an illustrative write anywhere policy of the procedure, the file system assigns pointer values (other than ABSENT values) to indirect block(s) of the file to thereby identify location(s) of the data stored locally within the volume. Thus, the remote fetch operation is no longer needed to access the data.

An example of a write allocation procedure that may be advantageously used with the present invention is described in U.S. Pat. No. 7,430,571, issued on Sep. 30, 2008 titled, Extension of Write Anywhere File Layout Write Allocation, by John K. Edwards and assigned to Network Appliance, Inc., which application is hereby incorporated by reference.

Broadly stated, block allocation proceeds in parallel on the flexible vvol and aggregate when write allocating a block within the vvol, with a write allocator process 282 selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid of the vvol and the vvbn are inserted into owner map 710 of the aggregate at an entry defined by the selected pvbn. The selected pvbn is also inserted into a container map (not shown) of the destination vvol. Finally, an indirect block or mode file parent of the allocated block is updated with one or more block pointers to the allocated block. The content of the update operation depends on the vvol embodiment. For the dual vbn hybrid vvol embodiment, both the pvbn and vvbn are inserted in the indirect block or mode as block pointers.

D. NRV Protocol

In the illustrative embodiment, the storage operating system utilizes the novel NRV protocol to retrieve ABSENT blocks from a remote storage system configured to act as a backing store for a sparse volume. It should be noted that the novel NRV protocol may also be utilized to retrieve non-ABSENT blocks from the backing store. Thus, the NRV protocol may be utilized to retrieve data in a file system that utilizes holes as described above. The NRV protocol typically utilizes the TCP/IP protocol as a transport protocol and all NRV messages (both requests and responses) are prefixed with a framing header identifying the length of the NRV message in bytes (exclusive of this length of the initial length header itself).

Figure 9:
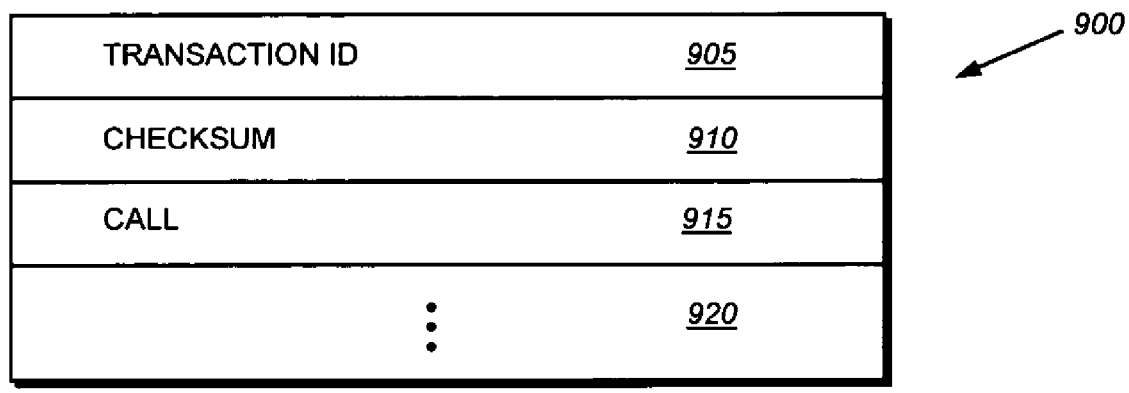
FIG. 9 is a schematic block diagram of a protocol header data structure in accordance with an embodiment of the present convention.

FIG. 9 is a schematic block diagram of an NRV protocol header data structure 900 in accordance with an embodiment of the present invention. The header data structure 900 includes a transaction identifier (ID) field 905, a checksum field 910, a call field 915 and, in alternate embodiments, additional fields 920. The transaction ID field 905 contains a unique transaction ID utilized by the protocol to pair requests and responses. Thus a NRV response from the backing store will identify which NRV request it is associated with by including the transaction ID of the request. The transaction ID is unique per request per connection. In the illustrative embodiment, the first transaction ID utilized per connection is a random value, which is thereafter incremented with each transaction. The checksum field 910 is utilized for storing checksum information to ensure that the response/request has not been corrupted.

Figure 10:
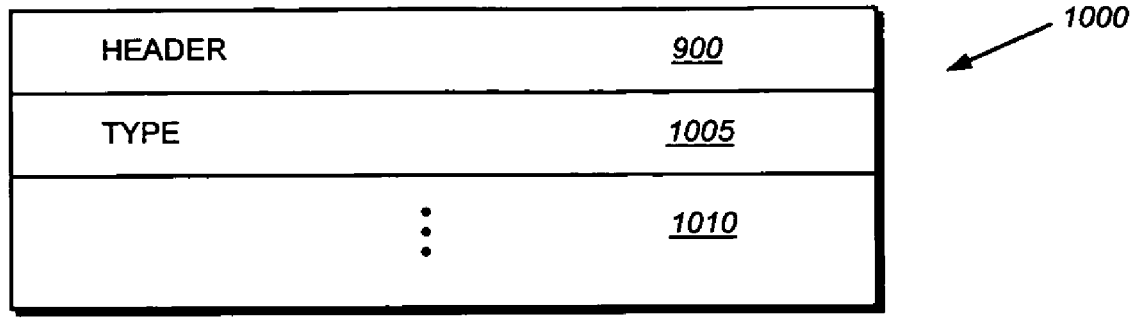
FIG. 10 is a schematic block diagram of a protocol request data structure in accordance with embodiment of the present convention.

FIG. 10 is a schematic block diagram of an exemplary protocol request data structure 1000 in accordance with embodiment of the present invention. The request data structure 1000 includes protocol header 900, a type field 1005 and, in alternate embodiments, additional fields 1010. The type field 1005 identifies one of the remote file system operations supported by the protocol. These types include, inter alia, INIT, VOLINFO, READ, LOCK_PCPI, UNLOCK_PCPI and AUTH, each of which is described in detail further below in reference to type-specific data structures. Each of these types of requests has a data structure associated therewith. The type-specific data structure is appended to the request data structure 1000 when transmitted to the backing store.

Figure 11:
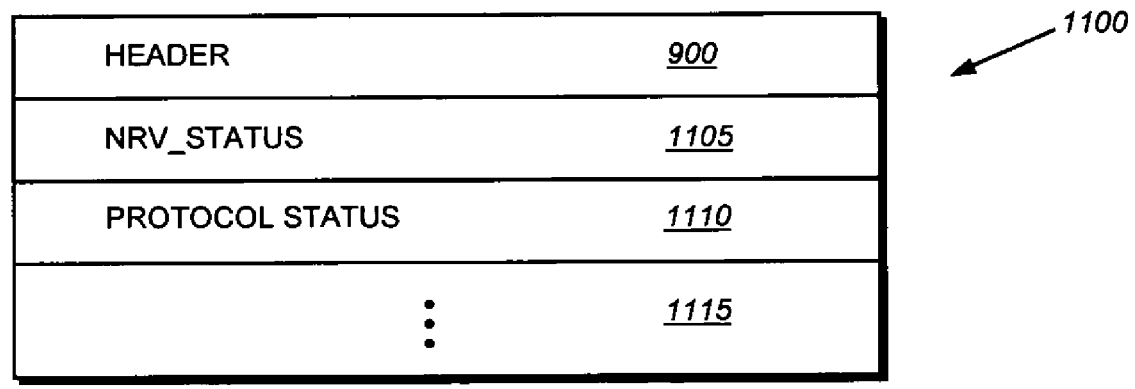
FIG. 11 is a schematic block diagram of a protocol response data structure in accordance with embodiment of present convention.

A response to the protocol request is in the format of a protocol response data structure 1100, which is illustratively shown as a schematic block diagram in FIG. 11. The response data structure 1100 includes header 900, a NRV_Status field 1105, a protocol status field 1110 and, in alternate embodiments, additional fields 1115. The NRV_Status field 1105 may include one of the protocol specific status indicators such as OK, NOINIT, VERSION, CANTSEND, LS, and FS_VERSION. It should be noted that in alternate embodiments, other and/or differing status indicators may be utilized. The OK status indicator signifies that the request was successful and that there is no error condition. The NOINIT indicator is sent in response to a request being transferred prior to beginning a session. In the illustrative embodiment, an INIT request, described further below, must be the first request in a session after any authentication (AUTH) requests. The VERSION indicator is utilized when there are mismatched versions of the NRV protocol, e.g., the storage system and backing store are utilizing incompatible versions of the NRV protocol. The CANTSEND indicator indicates a failure of the underlying transport protocol in transmitting a particular request or response. The LS status indicator is used by the backing store to indicate that a PCPI was not able to be locked in response to a LOCK_PCPI request, described further below. The FS_VERSION indicator means that the storage system and the backing store are utilizing incompatible versions of a file system so that data may not be retrieved from the backing store.

The protocol status field 1110 includes a file system error value. Thus, the protocol status field 1110 may be utilized to transfer a WAFL file system or other file system error value between the backing store and the storage appliance. Each of the NRV protocol operations that includes a response data structure includes a type-specific data structure that is appended to the end of a protocol response data structure 1100.

Figure 12:
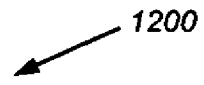
FIG. 12 is a schematic block diagram of a file handle data structure in accordance with an embodiment of the present convention.

Many NRV protocol requests and/or responses include a file handle identifying a file to which an operation is directed. FIG. 12 is a schematic block diagram of a file handle data structure 1200 in accordance with an embodiment of the present invention. The file handle data structure 1200 includes a file system ID field 1205, a PCPI ID field 1210, a file ID field 1215, a generation field 1220 and, in alternate embodiments, additional fields 1225. The file system ID field 1205 identifies the particular file system containing the file of interest. This may be a particular virtual volume or physical volume associated with the backing store. This field 1205 typically contains the fsid of the desired volume The PCPI ID field 1210 identifies the appropriate PCPI associated with the file. Thus, the NRV protocol permits access to a file stored within a particular PCPI. File ID field 1215 identifies the unique file ID associated with the file. The generation field 1220 contains a value identifying a particular generation of the inode associated with the file.

Figure 13:
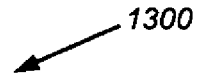
FIG. 13 is a schematic block diagram of a file attribute data structure in accordance with embodiment of the present convention.

Additionally, many NRV requests and responses contain a set of file attributes that are contained within an exemplary file attribute data structure 1300 as shown in a schematic block diagram of FIG. 13. The file attribute data structure 1300 includes a blocks field 1305, a size field 1310, a type field 1315, a subtype field 1320, a generation field 1325, a user identifier (UID) field 1330, a group identifier field (GID) 1335, a creation time field 1340 and, in alternate embodiments, additional fields 1345. The blocks field 1305 identifies the number of blocks utilized by the file. The size field 1310 contains the size of the file in bytes. The type and subtype fields 1315, 1320 identify the type and, if necessary, a subtype of the file. The generation field 1325 identifies the current generation number associated with the inode of the file. The UID field 1330 identifies the owner of the file, whereas the GID field 1335 identifies the current group that is associated with the file.

Figure 14:
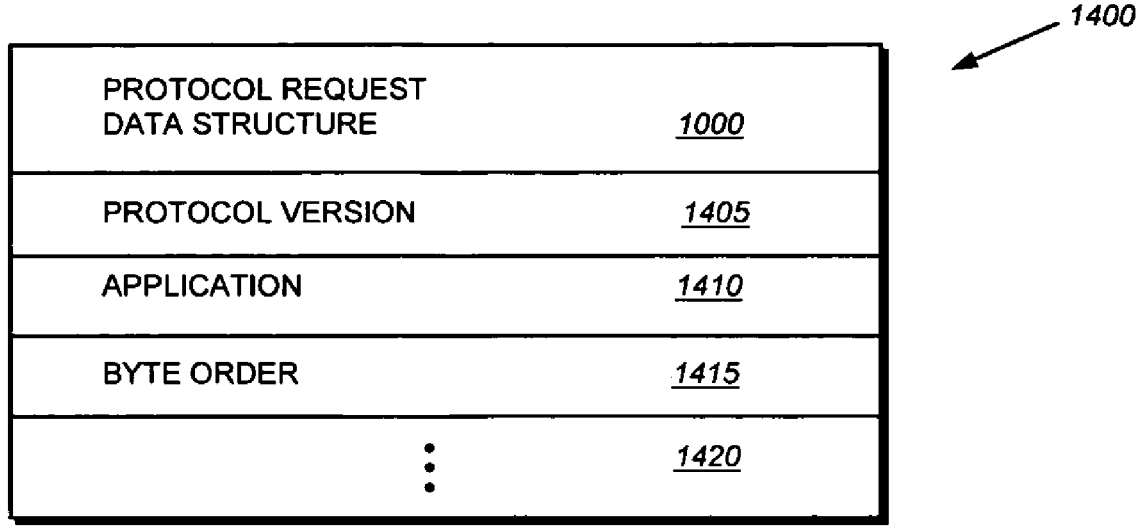
FIG. 14 is a schematic block diagram of an initialization (INIT) request data structure in accordance with embodiment of the present convention.

In accordance with the illustrative embodiment of the protocol, the first request sent over a connection, after any authentication requests described further below, is an initialization request. This initialization request (i.e. an INIT type of type field 1005) comprises an initialization data structure 1400, which is exemplary shown as a schematic block diagram in FIG. 14. The initialization data structure 1400 includes a protocol request data structure 1000, a protocol version field 1405, an application field 1410, a byte order field 1415 and, in alternate embodiments, additional fields 1420. The request data structure 1000 is described above in reference to FIG. 10. The protocol version field 1405 contains a protocol "minor" version in use at the client (storage appliance initiating the connection) that identifies clients utilizing different versions of the protocol. The application field 1410 identifies the application utilizing the NRV protocol; such applications may include restore on demand (ROD) or proxy file system (PFS). Restore on demand techniques are further described in U.S. Patent Publication No. 2007/0124341, published on May 31, 2007 entitled SYSTEM AND METHOD FOR RESTORING DATA ON DEMAND FOR INSTANT VOLUME RESTORATION by Jason Lango et al., and proxy file systems are further described in U.S. Patent Publication No. 2007/0250552, published on Oct. 25, 2007 entitled SYSTEM AND METHOD FOR CACHING NETWORK FILE SYSTEMS by Jason Lango et al. The byte order field 1415 identifies the client's native byte order, e.g., big or little endian.

Figure 15:
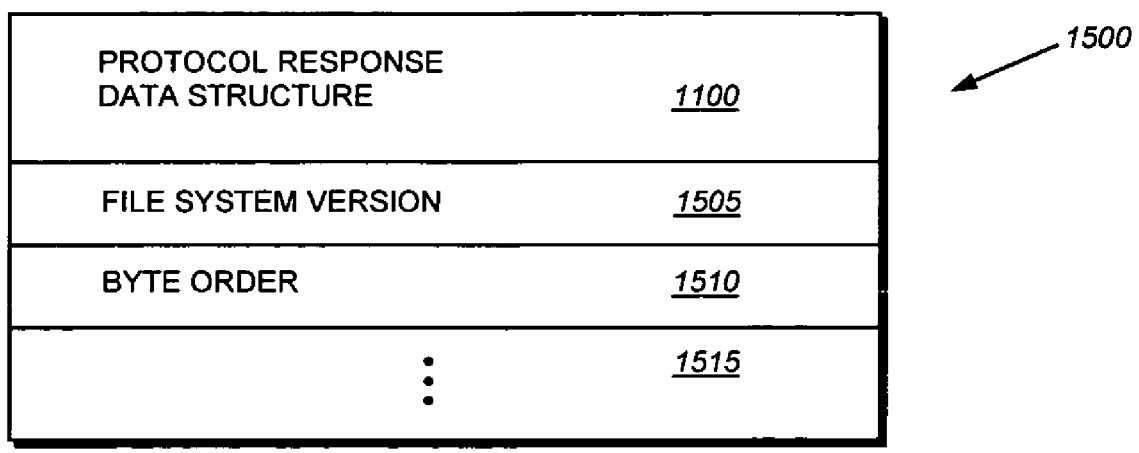
FIG. 15 is a schematic block diagram of an initialization (INIT) response data structure in accordance with embodiment of the present convention.

In response to the initialization request data structure 1400, the backing store transmits an initialization response data structure 1500, which is illustratively shown in a schematic block diagram of FIG. 15. The initialization response data structure 1500 includes a protocol response data structure 1100, a file system version field 1505, a byte order field 1510 and, in alternate embodiments, additional fields 1515. The response data structure 1100 is described above in reference to FIG. 11. The file system version field 1505 identifies the maximum file system version supported by the backing store. The byte order field 1510 identifies the backing store's native byte order. In the protocol specification, if the storage system's and backing store's byte orders differ, all future communication occurs using the backing store's of byte order as defined in field 1510.

Figure 16:
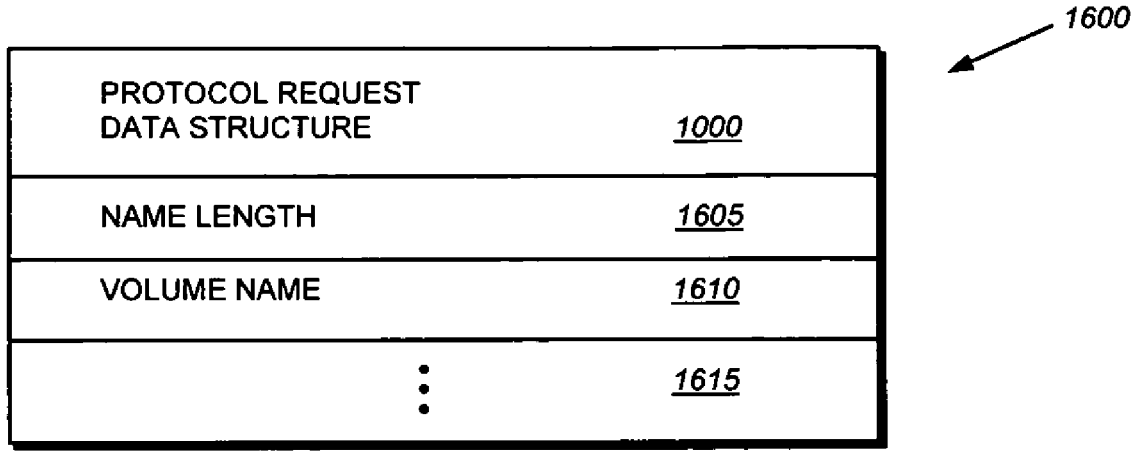
FIG. 16 is a schematic block diagram of a volume information (VOLINFO) request data structure in accordance with embodiment of the present convention.

To retrieve information pertaining to a particular volume, the storage appliance may transmit a volume information (VOLINFO) request data structure 1600, which is shown as a schematic block diagram of FIG. 16. The volume information data structure 1600 includes a protocol request data structure 1000, a name length field 1605, a volume name field at 1610 and, in alternate embodiments, additional fields 1615. The name length field 1605 identifies length of the volume name field while the volume name field 1610 comprises a text string of the volume name. The VOLINFO request is utilized to obtain volume information, which may be used to, e.g., ensure that a volume on the storage system is sufficiently sized to accommodate all data located on a volume on the backing store.

Figure 17:
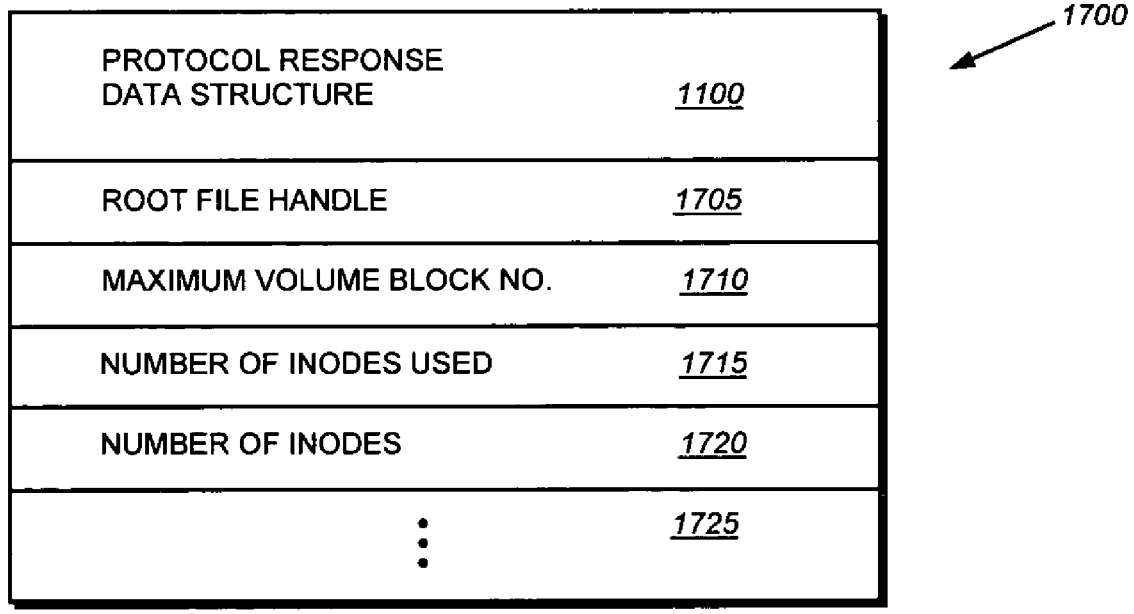
FIG. 17 is a schematic block diagram of a volume information (VOLINFO) response data structure in accordance with embodiment of the present convention.

In response to a volume information request, the backing store will issue a volume information response data structure 1700, of which an exemplary schematic block diagram is shown in FIG. 17. The volume information response data structure 1700 comprises a protocol response data structure 1100, a root file handle field 1705, a maximum volume block number field 1710, a number of inodes used field 1715, a number of inodes field 1720 and, in alternate embodiments, additional fields 1725. The root file handle field 1705 contains a conventional file handle for the root directory of the specified volume. The maximum volume block number field 1710 is set to the greatest allowable volume block number in the file system of the specified volume. The value of this field plus one is the size of the volume in blocks as, in the illustrative embodiment, volume block numbers begin with vbn 0. Thus, in the illustrative embodiment of the WAFL file system, which utilizes 4 KB blocks, the value of this field plus one is the size of the volume in 4 KB blocks. The number of inodes used field 1715 contains number of inodes in use in the active file system of the specified volume, whereas the number of inodes field 1720 holds the total number of allocable inodes in the active file system of the specified volume.

Figure 18:
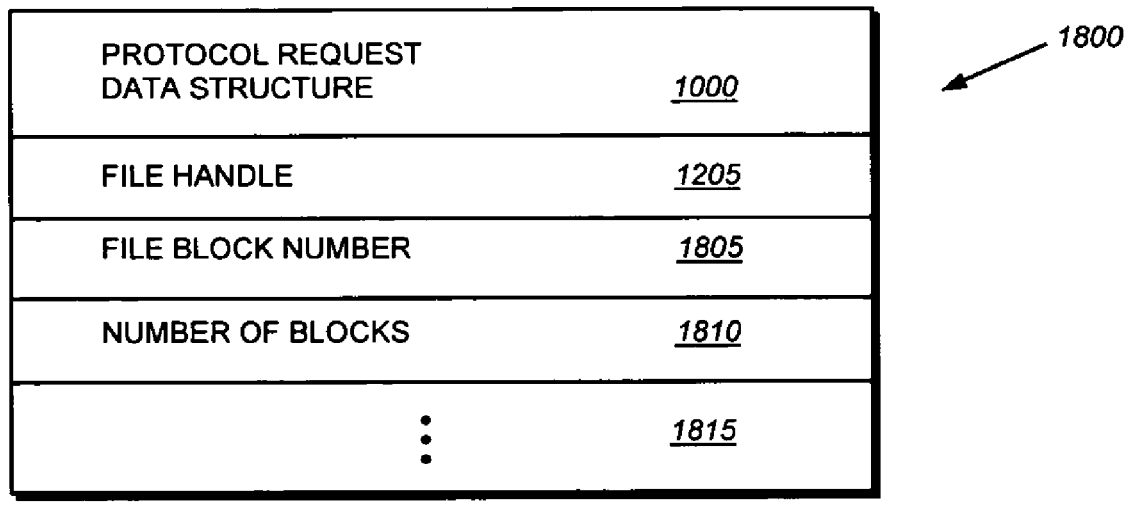
FIG. 18 is a schematic block diagram of a read (READ) request data structure in accordance with embodiment of the present convention.

FIG. 18 is a schematic block diagram of an exemplary read (i.e.; a READ type of field 1005) request 1800 in accordance with an embodiment of the present intention. The read request data structure 1800 includes protocol request data structure 1000, file handle 1200, a file block number field 1805, a number of blocks field 1810 and, in alternate embodiments, additional fields 1815. The request data structure 1000 is described above in reference to FIG. 10, whereas the file handle data structure 1200 is described above in reference to FIG. 12. The file block number field 1805 identifies the first file block to be read. The file block number represents an offset of 4 KB blocks into the file. In alternate embodiments, where the file system utilizes differing sizes for file blocks, the file block number is the offset in the appropriate block size into the file. The number of blocks field 1810 identifies the number of file blocks to be read.

Figure 19:
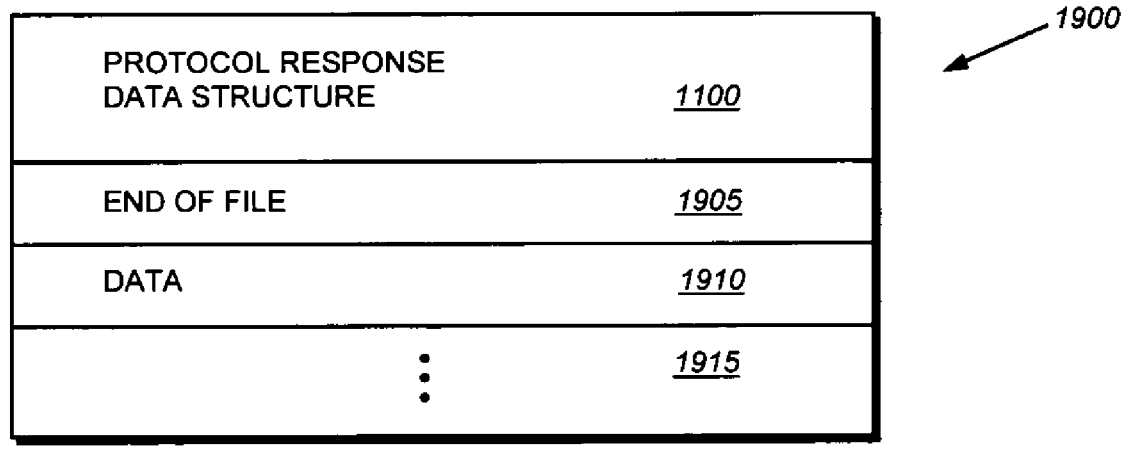
FIG. 19 is a schematic block diagram of a read (READ) response data structure in accordance with embodiment of the present convention.

A read request response data structure 1900 is illustratively shown in FIG. 19. The read response data structure 1900 includes response data structure 1100, an end of file field 1905, a data field 1910 and, in alternate embodiments, additional fields 1915. The response structure 1100 is described above in reference to FIG. 11. The end of file field 1905 identifies whether there is additional data to be read from the file and, if not, its content may be set to a FALSE value. Alternatively, the field 1905 may be set to a TRUE value if the end of the file has been reached by the requested read operation. The data field 1910 is a variable number of bytes of data from the file, starting at the requested file block number.

Another type of remote file system operation supported by the novel NRV protocol is the lock PCPI operation (i.e., a LOCK_PCPI type field 1005) that is used to prevent a PCPI from being deleted on the backing store. The Lock PCPI operation is typically utilized when the PCPI is necessary for a "long-lived" application, such as restore on demand. In the illustrative embodiment, the locked PCPI command is an inherently stateful request that instructs the backing store to prevent deletion of the PCPI until either the client disconnects or unlocks the PCPI (the latter with the unlocked PCPI command described further below). An exemplary LOCK_PCPI request data structure 2000 is illustratively shown as a schematic block diagram in FIG. 20. The LOCK_PCPI request data structure 2000 includes a request data structure, a file system ID field 2005, a lock default PCPI field 2010, a checked PCPI configuration field 2015, a PCPI name length field 2020, a PCPI information field 2100, a PCPI name field 2030 and, in alternate embodiments, additional fields 2035. The request data structure 1000 is described above in conjunction with FIG. 10. The file system ID field 2005 identifies the volume containing the PCPI to be locked. The lock default PCPI field 2010 may be set to a value of TRUE or FALSE. If it is set to TRUE, then the backing store locks the default PCPI for the volume identified and ignores the name and information fields 2030, 2100. If the value if FALSE then the values of these fields 2030, 2100 are utilized in identifying the PCPI. In certain embodiments, the backing store may be configured to have a default PCPI for use in serving NRV protocols. This default PCPI may be selected by the use of the lock default PCPI field 2010. The check PCPI configuration field 2015 may also be set to a value of TRUE or FALSE. If TRUE then the server verifies that the specified volume is an acceptable secondary volume for use in a sparse volume application. The PCPI name length field 2020 is set to the length of the PCPI name field, which holds a string comprising the name of the PCPI to be locked.

The PCPI information field 2100 comprises a PCPI information data structure 2100 illustratively shown as a schematic block diagram of FIG. 21. The PCPI information data structure 2100 includes an identifier field 2105, a consistency point count field 2110, a PCPI creation time field 2115, a PCPI creation time in microseconds field 2120 and, in alternate embodiments additional fields 2125. The identifier field 2105 is a PCPI identifier that uniquely identifies a particular PCPI. The consistency point count field 2110 identifies a particular CP count associated with the PCPI. Illustratively, at each CP, the CP count is incremented, thereby providing a unique label for the PCPI created at that point in time. Similarly, the PCPI creation time fields 2115, 2120 are utilized to uniquely identify the particular PCPI by identifying its creation time in seconds and microseconds, respectively.

In response the server sends a lock_PCPI response data structure 2200, of which a schematic block diagram of which s shown in FIG. 22. The lock PCPI response data structure 2200 includes a response data structure 1100, PCPI information data structure 2100, a blocks used field 2210, a blocks_holes field 2215, a blocks_overwrite field 2220, a blocks_holes_CIFS field 2225, an inodes used field 2230, a total number of inodes field 2235 and, in alternate embodiments, additional fields 2240. The response data structure 1100 is described above in reference to FIG. 11. The PCPI information data structure 2100 is described above in reference to FIG. 21. The blocks used field 2210 contains a value identifying the number of blocks that are utilized by the PCPI on the backing store. The blocks_holes field 2215 identifies the number of blocks in the PCPI that are reserved for holes within the PCPI. The blocks_overwrite field 2220 contains a value identifying the number of blocks that are reserved for overwriting in the PCPI. The inodes field 2230 contains a value identifying the number of inodes used in the PCPI and the total number of inodes field 2235 contains a value identifying the total number of allocable inodes in the PCPI.

Once a client no longer requires a PCPI to be locked, it may issue an unlock PCPI command (of type UNLOCK_PCPI in field 1005) to the backing store. The client issues such a command by sending an unlock PCPI request data structure 2300 as illustratively shown in FIG. 23. The unlock PCPI command data structure 2300 includes a request data structure 1000, a file system ID field 2305, a PCPI ID field 2310 and, in alternate embodiments additional fields 2315. The requested data structure 1000 is described above in conjunction with FIG. 10. The file system identifier field 2305 identifies the volume containing the PCPI to the unlocked. The PCPI identifier field 2310 identifies the PCPI previously locked using LOCK_PCPI request. In accordance with the protocol, the server must unlocked the PCPI prior to responding to this command. The response to an unlock PCPI request is illustratively a zero length message body.

As noted above, the first request issued over a protocol connection is a series of authentication requests (i.e., a AUTH type of field 1005). The authentication request is utilized for NRV session authentication and, in the illustrative embodiment, is preferably the first request issued over an NRV connection. The backing store and storage appliance may negotiate with any number of authentication request/response pairs. An illustrative schematic block diagram of an authentication request data structure 2400 is shown in FIG. 24. The AUTH request data structure 2400 includes a request data structure 1000, a length field 2405, a type field 2410, an application field 2415, a data field 2420 and, in alternate embodiments, additional fields 2425. The requested data structure 1000 is described above in conjunction with FIG. 10. The length field 2405 identifies the number of bytes contained within the data field 2420. Type field 2410 identifies a type of authentication to be utilized. The application field 2415 identifies one of a plurality of applications that utilizes the protocol. The application utilizing the protocol is identified so that, for example, the backing store may impose higher or lower authentication and standards depending on the type of application utilizing the protocol. The data field 2420 contains authentication data.

In response, the backing store sends an authentication response data structure 2500 as shown in FIG. 25. The authentication response data structure 2500 includes response data structure 1100, a status field 2505, a data field 2510 and, in alternate embodiments, additional fields 2515. The response data structure 1100 is described above in reference to FIG. 11. The status field 2505 identifies the current status of the authentication e.g., OK, signifying that authentication is complete, or NEED_AUTHENTICATION, signifying that the backing store requests that the storage system transmit a higher level of authentication. The status field 2505 may also hold a value of CONTINUE, which may be utilized if multiple exchanges are required to authenticate the session. The data field 2510 contains the authentication response data.

Figure 26:
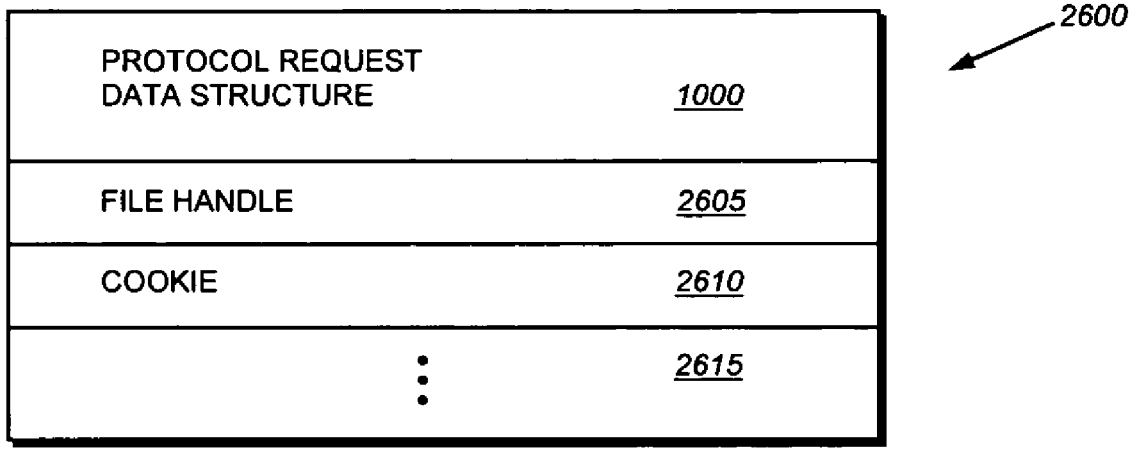
FIG. 26 is a schematic block diagram of a get holy bitmap (GET_HOLY_BITMAP) request data structure in accordance with an embodiment of the present invention.

The NRV protocol also supports a get holy bitmap function (i.e., a GET_HOLY_BITMAP type of field 1005) that identifies which, if any, blocks on a backing store are not present, e.g., either absent or a hole. FIG. 26 is a schematic block diagram of an exemplary GET_HOLY_BITMAP request data structure 2600 in accordance with an embodiment of the present invention. The request 2600 includes a protocol request data structure 1000, a file handle 2605, a cookie value 2610 and, in alternate embodiments, additional field 2615. The protocol request data structure 1000 is described above in reference to FIG. 10. The file handle field 2605 contains a protocol file handle that identifies the file system ID, snapshot ID and file ID of the file for which the bitmap is to be obtained. The cookie field 2610 contains one of two values. The first value is a predetermined value utilized for an initial request. The second value is the value of the last cookie value received from the backing store to be utilized for continued retrieval of bitmaps.

Figure 27:
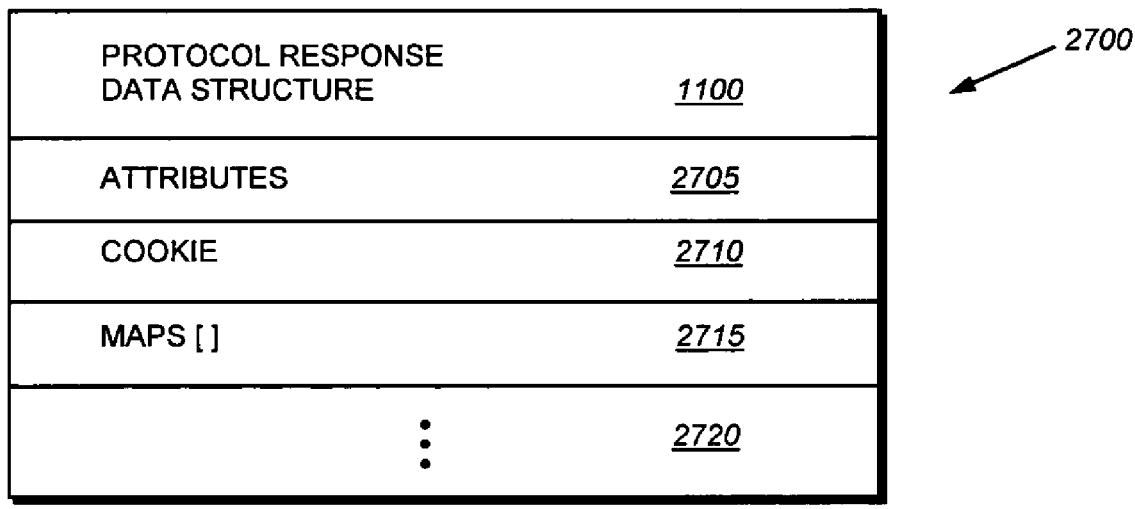
FIG. 27 is a schematic block diagram of a get holy bitmap (GET_HOLY_BITMAP) response data structure in accordance with an embodiment of the present invention.

FIG. 27 is a schematic block diagram of an exemplary GET_HOLY_BITMAP response data structure 2700 in accordance with an embodiment of the present invention. The response data structure 2700 includes a protocol response data structure 1100, and attributes field 2705, a cookie field 2710, an array of maps 2715 and, in alternate embodiments, additional fields 2720. The protocol response data structure 1100 is described above in reference to FIG. 11. The attributes of field 2705 contains the most up to date file attributes of the identified file at the time the GET_HOLY_BITMAP request is processed. The cookie field 2710 contains a cookie that is of one of two values. The first value is a predefined value utilized for the final response. The second value is a new cookie value to be utilized by the storage system for continued retrieval operations. The maps array 2715 it is a variable length array of indirect block map structures 2800.

Figure 28:
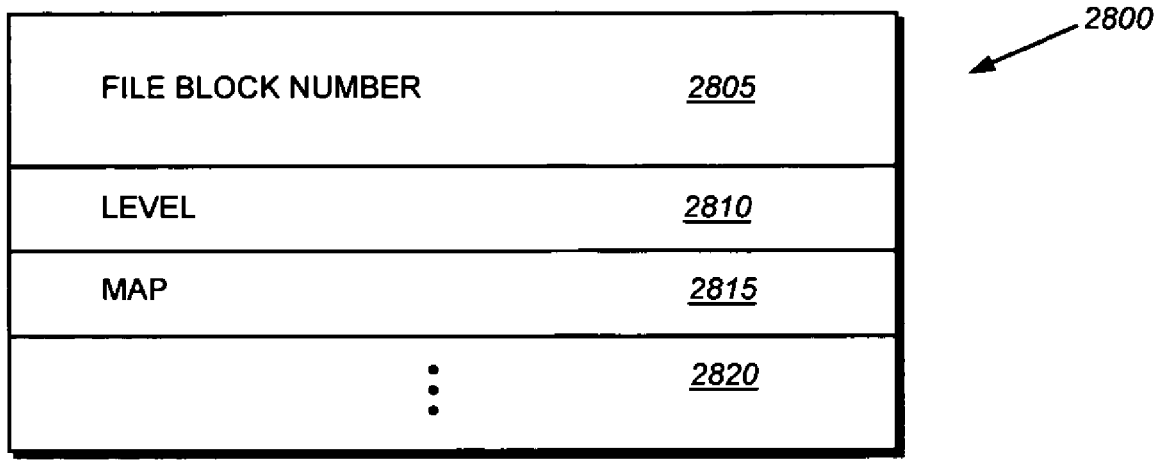
FIG. 28 is a schematic block diagram of a indirect block map structure in accordance with an embodiment of the present invention.

FIG. 28 is a schematic block diagram of an exemplary indirect block map structure 2800. The indirect block map structure 2800 comprises of a file block number field to a 2805, a level field 2810, a map field 2815, and, in alternate embodiments, additional fields 2820. The file block number field 2805 in conjunction with the level field 2810 identifies an indirect block in a buffer tree of the specified file. The map field 2815 is a bitmap wherein every bit that is set in the bitmap represents a missing block (absent or hole) at the index in the indirect block. That is, for any block that is missing (absent or a hole) in the identified indirect block, a bit will be set. In the illustrative embodiment, the response from the request is utilized to ensure that appropriate space reservations are made when first accessing a file.

E. Pre/Post Operation Attributes

Network file system protocols typically provide information within the protocol so that clients may cache data to provide an accurate and consistent view of the file system. For example, in the Network File System (NFS) Version 2, file attributes are sometimes returned along with operations, thereby permitting clients to cache data as long as the attributes have not been modified. This was further improved in version 3 of NFS where many operations that modify the file system return attributes from before the operation as well as after the operation. This feature allows a client to recognize if its cached content was up-to-date before the operation was executed. If the cache content was accurate, the client may update its cache by doing the update locally without invalidate its own cached content. This technique is known as pre/post operation attributes.

Most file systems cache content based on a file's unique file handle. While most network operations in protocols that modify the file system have the necessary file handle in attributes allow the client to correctly update its cache, there are some operations that do not include sufficient information. These operations typically reference files using a directory file handle and a file name, which results in the client receiving a response from which it cannot determine which file was referenced and potentially modified. As a client cannot determine which file was referenced and/or modified, it is unable to ensure that its cache is consistent with the state of the file system. One advantage of the present invention is that the novel NRV protocol provides sufficient information to permit proper caching of any object modified on the origin server using any of these operations.

Figure 29:
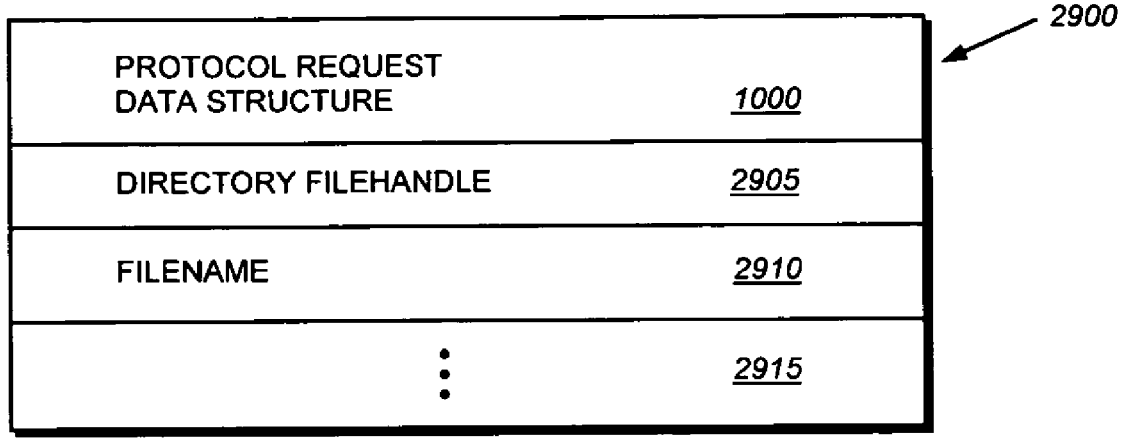
FIG. 29 is a schematic block diagram of a remove (REMOVE) request data structure in accordance with an embodiment of the present invention.

FIG. 29 is a schematic block diagram of a remove request data structure 2900 (i.e., a REMOVE type of field 1005) in accordance with an embodiment of the present invention. The remove request data structure 2900 includes a protocol request data structure 1000, a directory file handle field 2905, a filename field 2910 and, in alternate embodiments, additional fields 2915. The request data structure 1000 is described above in reference to FIG. 10. The directory file handle field 2905 comprises a file handle associated with a particular directory within the file system. The filename field 2910 contains the filename of the file to be removed.

Figure 30:
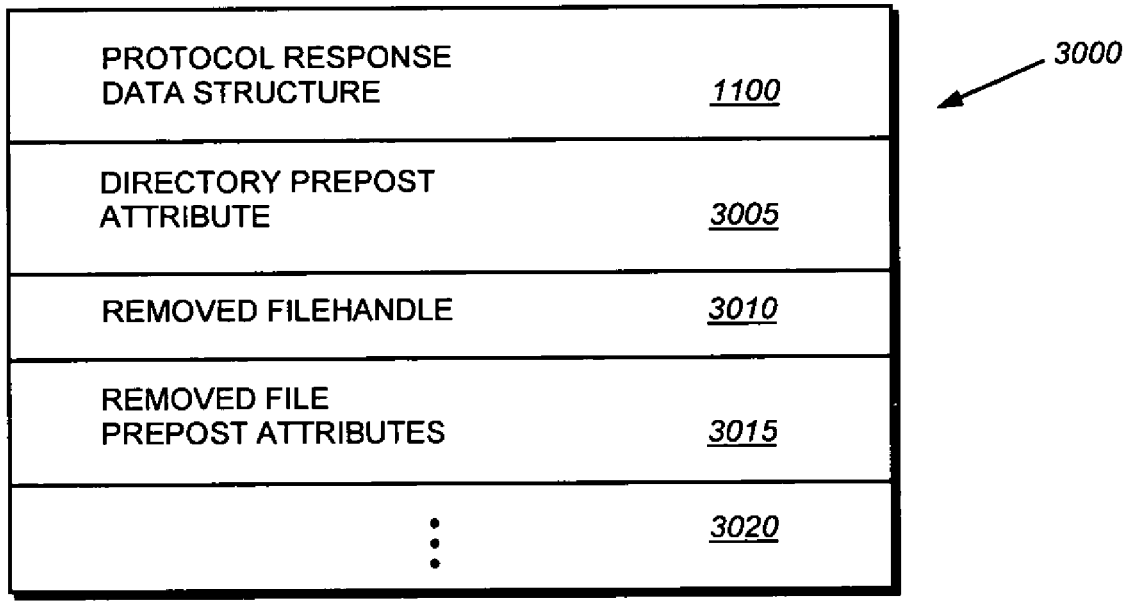
FIG. 30 is a schematic block diagram of a remove (REMOVE) response data structure in accordance with an embodiment of the present invention.

A remove response data structure 3000 is illustratively shown in FIG. 30. The remove response data structure 3000 illustratively includes a protocol response data structure 1100, a directory pre/post attributes field 3005, a removed file handle field 3010, a removed file pre/post attributes field 3015 and, in alternate embodiments, additional fields 3020. The protocol response data structure 1100 is described above in reference to FIG. 11. The directory pre/post attributes field 3005 contains the attributes for the directory both before and after the removal. These attributes permit clients to properly maintain their caches. The removed file handle field 3010 contains the file handle for the file that was removed while processing the remove operation. The removed file pre/post attributes contains the attributes for the file prior to and following the removal operation.

Figure 31:
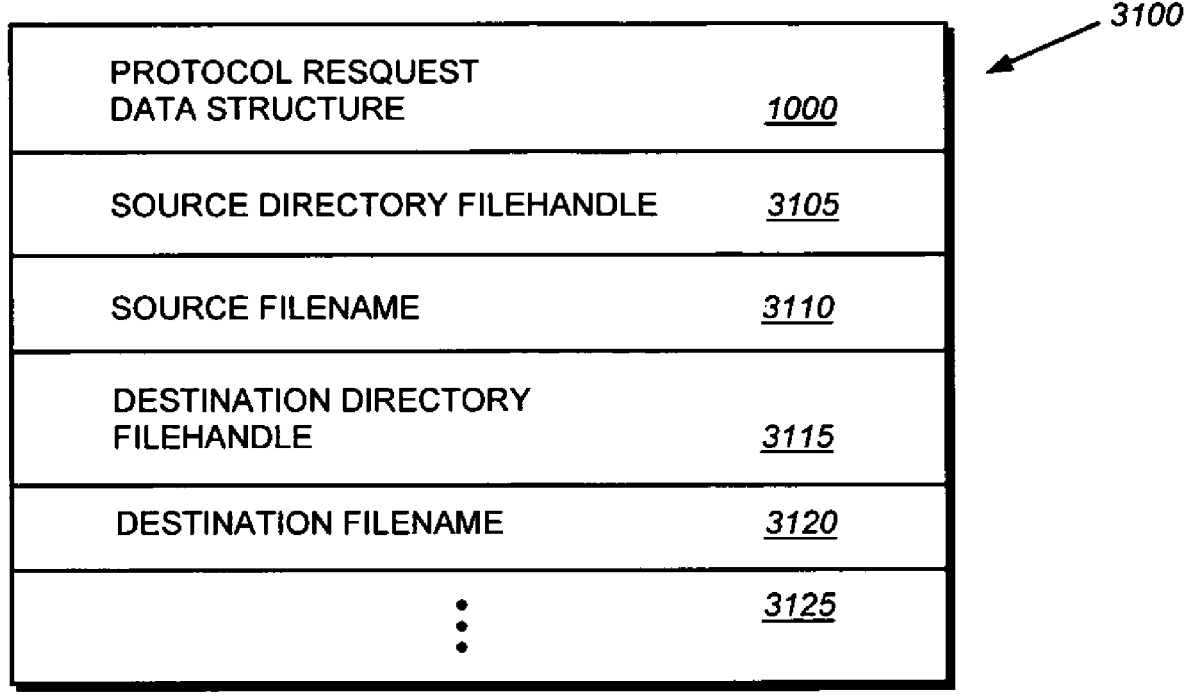
FIG. 31 is a schematic block diagram of a rename (RE-NAME) request data structure in accordance with an embodiment of the present invention.

FIG. 31 is a schematic block diagram of an exemplary rename request 3100 (i.e., a RENAME type of field 1005) in accordance with an embodiment of the present invention. The rename request data structure 3100 includes a protocol request data structure 1000, a source directory file handle 3105, a source file name field 3110, a destination directory file handle field 3115, a destination file name field 3120, and in alternate embodiments additional fields 3125. The protocol request data structure 1000 is described above in reference to FIG. 10. The source directory file handle field 3105 contains the file handle identifying the source directory of the file to be renamed. The source filename field 3110 contains the filename of a file within the source directory identified by the source directory file handle field 31051. The destination directory file handle field 3115 contains a file handle for the directory to which she file is to be renamed. The destination file name field 3120 contains the filename of the resulting file.

Figure 32:
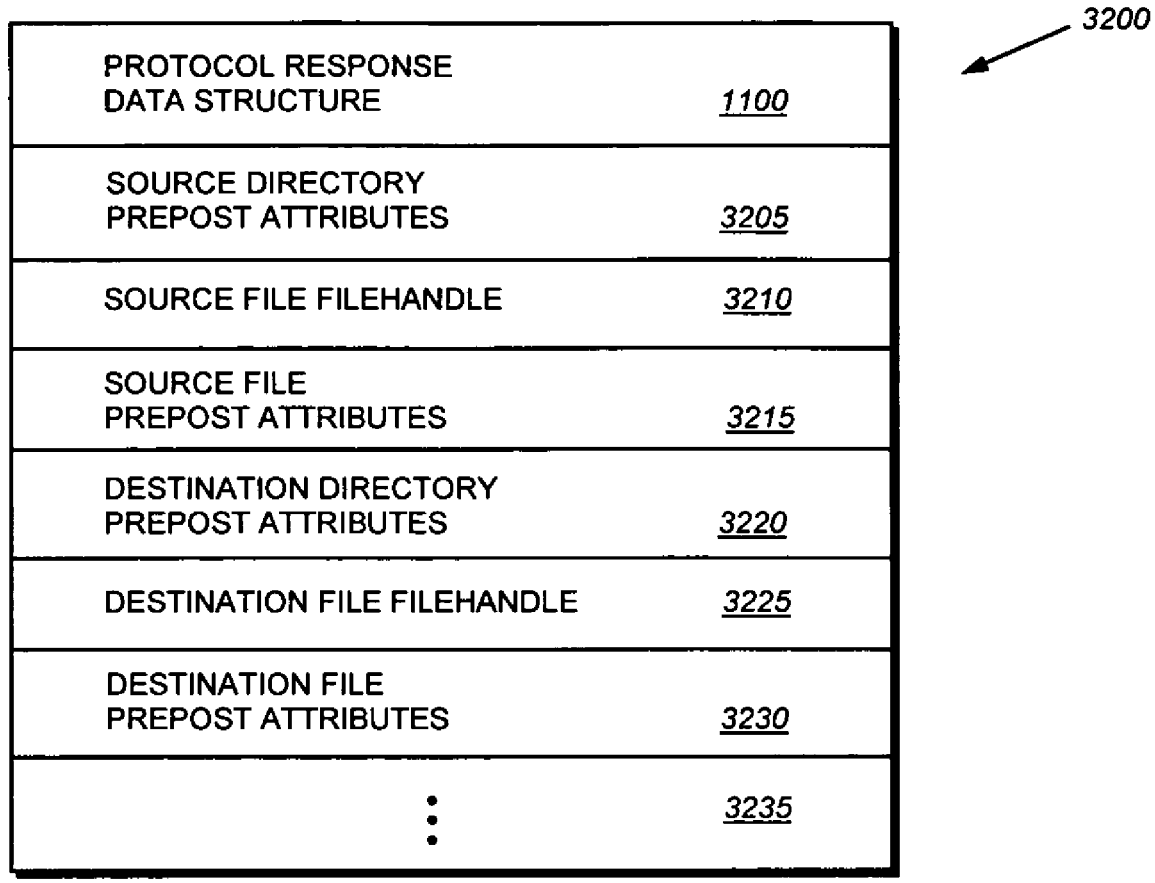
FIG. 32 is a schematic block diagram of a rename (RE-NAME) response data structure in accordance with an embodiment of the present invention.

FIG. 32 is a schematic block diagram of an exemplary of a rename response data structure 3200 in accordance with an embodiment of the present invention. The rename response data structure 3200 includes a protocol response data structure 1100, a source directory pre-post attributes field 3205, a source file handle field 3210, a source file pre/post attributes field 3215, a destination directory pre/post attributes field 3220, a destination file handle field 3225, a destination file pre/post attributes field 3230 and, in alternate embodiments additional fields 3235. The protocol response data structure 1100 is described above in reference to FIG. 11. The source directory pre/post attributes field 3205 contains the attributes for the source directory before and after the rename operation. The source file handle field 3210 contains a file handle associated with the file prior to the rename operation. The source file pre/post attributes field 3215 contains the attributes associated with the file prior to and immediately following the rename operation. The destination directory pre/post attributes field contains the attributes associated with the directory of the directory in which the file is being renamed. The destination file handle field 3225 contains the file handle for the newly renamed file, while the destination file pre-/post attributes field 3230 contains the file attributes for the destination file both before and after the rename operation.

Figure 33:
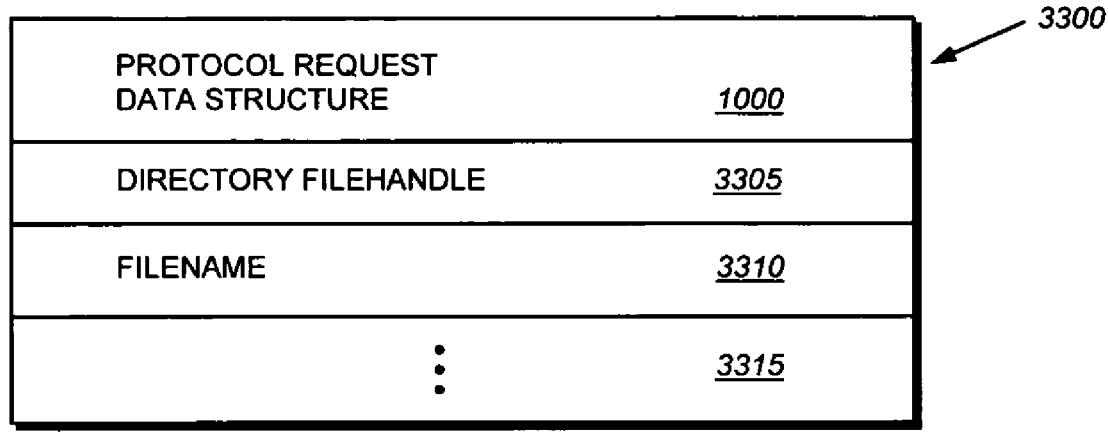
FIG. 33 is a schematic block diagram of a create (CRE-ATE) request data structure in accordance with an embodiment of the present invention.

FIG. 33 is a schematic block diagram of an exemplary create request 3300 in accordance with an embodiment of the present invention. The create request data structure 3300 includes a protocol request data structure 1000, a directory file handle field 3305, a file name field 3310 and, in alternate embodiments additional fields 3315. The protocol request data structure 1000 is described above in reference to FIG. 10. The directory file handle field 3305 contains a file handle identifying the directory in which the file is to be created. The filename field 3310 identifies the name to be utilized for the creation of the file.

Figure 34:
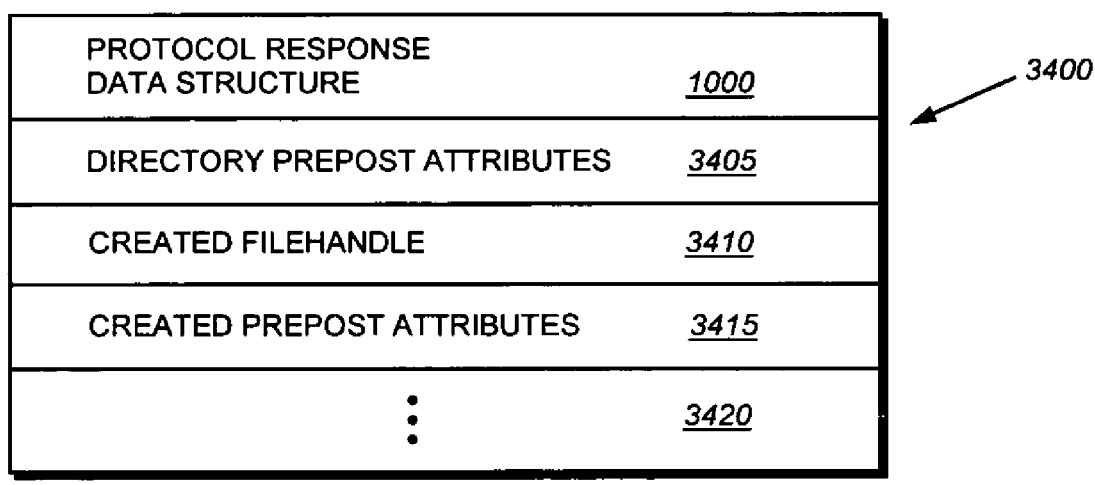
FIG. 34 is a schematic block diagram of a create (CRE-ATE) response data structure in accordance with an embodiment of the present invention

FIG. 34 is a schematic block diagram of a create response data structure 3400 in accordance with an embodiment of the present invention. The create response data structure 3400 includes a protocol response data structure 1100, a directory pre/post attributes field 3405, a created file handle field 3410, a created pre/post attributes field 3415 and, in is alternate embodiments, additional fields 3420. The protocol response data structure 1100 is described above in relation to FIG. 11. The directory pre/post attributes field 3405 contains the attributes for the directory containing the newly created file both before and after the creation of the file. The created file handle field 3410 contains the file handle for the newly created file. The created file pre/post attributes field 3415 contains the attributes for the file prior to and following the file creation.

E. Retrieval of Data Using the NRV Protocol

Figure 35:
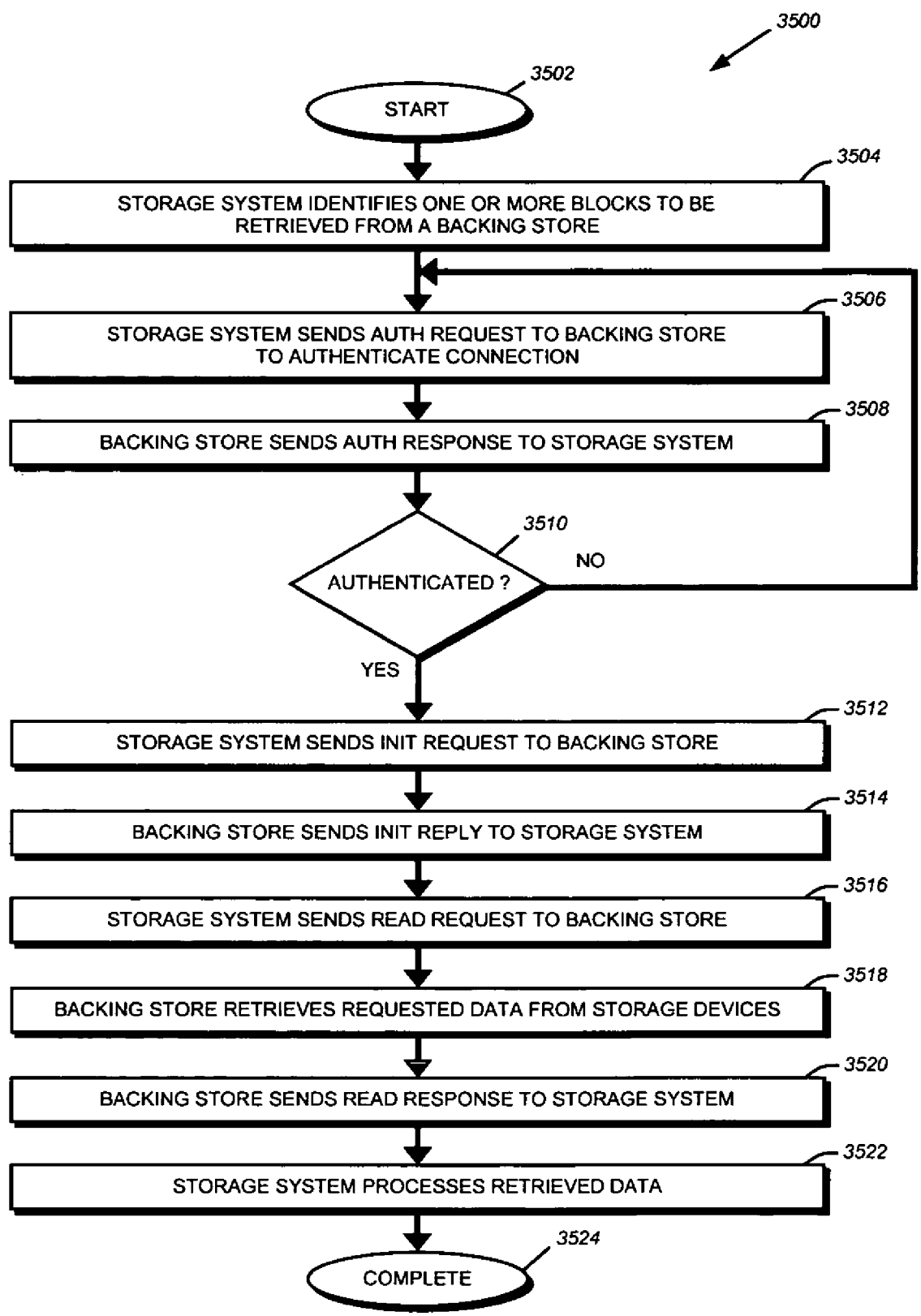
FIG. 35 is a flow chart detailing the steps of a procedure for retrieving one or more blocks from a backing store utilizing the NRV protocol in accordance with an embodiment of the present convention.

FIG. 35 is a flow chart detailing the steps of a procedure 3500 for retrieving one or more blocks from a backing store utilizing the novel NRV protocol in accordance with an embodiment of the present invention. The procedure begins in step 3502 and continues to step 3504 where a storage appliance identifies one or more blocks to be retrieved from a backing store. This identification may be made by determining that the blocks are marked ABSENT, as in the case of a sparse volume, or may be determined by other, alternate means. In response, the storage system sends an AUTH request to the backing store to authenticate the connection in step 3506. The backing store responds with an AUTH response in step 3508 and in step 3510, a the storage system determines whether the connection has been authenticated. If it has not been authenticated, the procedure branches back to step 3506 and the storage appliance sends another AUTH request to the backing store. However, if the connection has been authenticated in step 3510, the procedure continues to step 3512 where the storage appliance sends an INIT request to the backing store. In response, the backing store sends an INIT reply to the storage appliance in step 3514. At this point, the protocol connection between the storage appliance and backing store has been initialized and authenticated, thereby enabling issuance of additional commands including, for example a VOLINFO command.

In this illustrated example, the storage appliance sends a READ request to the backing store in step 3516. In response the backing store retrieves the requested data from its storage devices in step 3518 by, for example, retrieving the data from disk. The backing store then sends a READ response including the requested data to the storage to appliance in step 3520. Upon receiving the requested data, the storage appliance processes the retrieved data in step 3522. The process then completes in step 3524.

Figure 36:
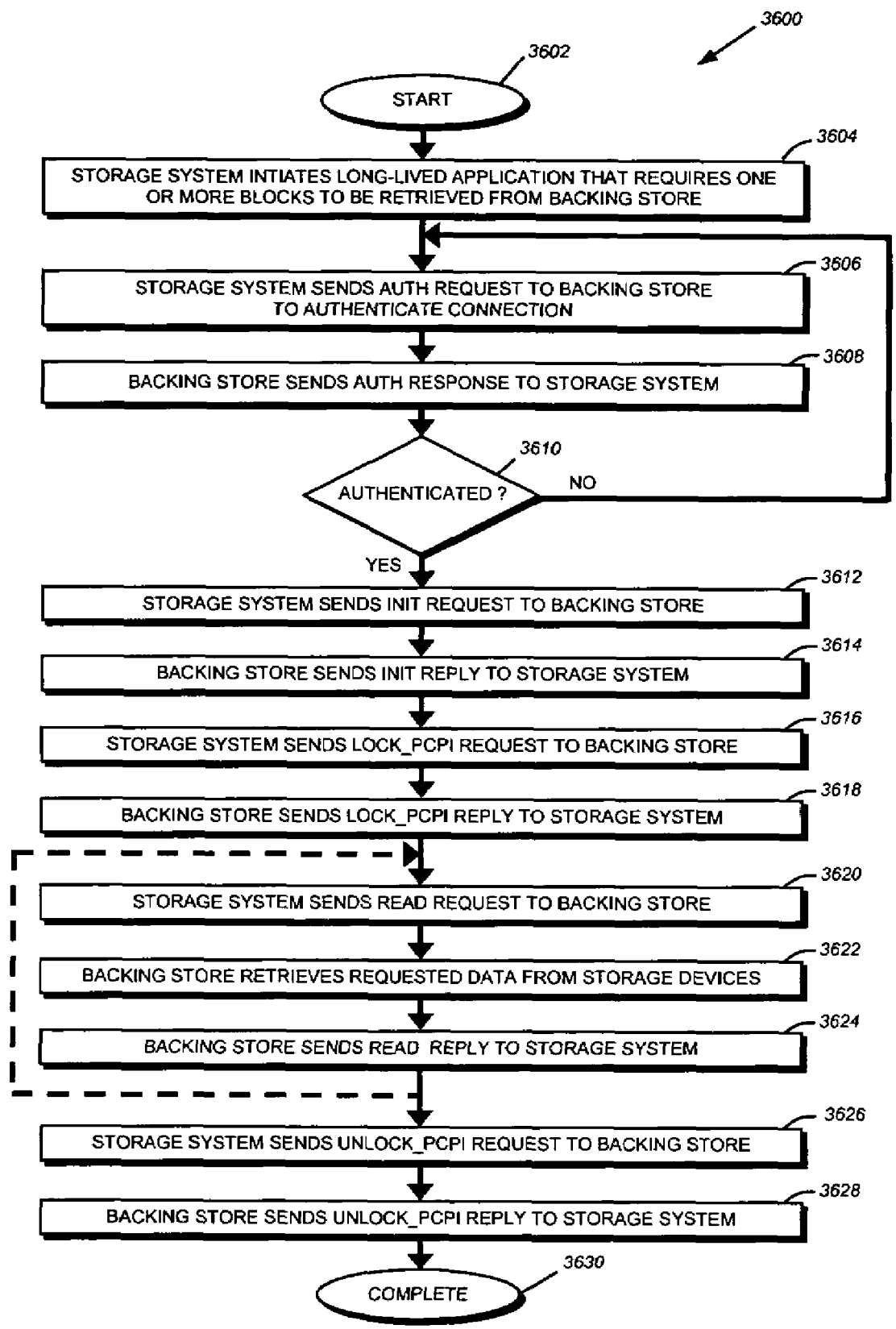
FIG. 36 is a flow chart detailing the steps of a procedure showing the use of the LOCK_PCPI command in accordance with an embodiment of the present convention.

FIG. 36 is a flow chart detailing the steps of a procedure 3600 for using the lock PCPI command with a long-lived application. The procedure begins in step 2702 and continues to step 3604 were the storage system initiates a long-lived application that requires one or more blocks to be retrieved from the backing store. The long-live application may comprise a restore on demand application or any other application that may require continued use of a particular file or PCPI on the backing store. The storage appliance then sends an AUTH request (step 3606) to the backing store to authenticate the connection. In response, the backing store transmits an AUTH response to the storage appliance in step 3608. In step 3610, a determination is made as to whether the connection is authenticated. If not, the procedure loops back to step 3606. Otherwise, the procedure continues to step 3612 where the storage system transmits an INIT request to the backing store, which responds (in step 3614) by sending an INIT response. Once the communication has been authenticated and initialized, the storage system sends a lock PCPI request to the backing store in step 3616 that identifies the appropriate PCPI to be locked. In response, the backing store locks the requested PCPI and send a lock PCPI reply to the storage appliance in step 3618.

The storage appliance may then send a READ request to the backing store in step 3620. In response, the backing store retrieves the requested data from its storage devices in step 3622 and a sends a READ reply, including the requested data, to the storage appliance in step 3624. It should be noted that during the course of the long-lived application, steps to 3620-3624 may be repeated a plurality of times. Additionally, alternate commands other than a READ request may be issued by the storage appliance to the backing store. In response to such alternate commands, the backing store processes the received commands in accordance with the protocol specification as described above. At some point in time, when the long-lived application no longer requires the use of the particular PCPI, the storage appliance sends an unlock PCPI request to the backing store (step 3626). In response, the backing store unlocks the identified PCPI and sends an unlock PCPI reply to the storage appliance in step 3628. The procedure then completes in step 3630.

To again summarize, the present invention is directed to system and method for supporting a sparse volume within a file system of a storage system. In accordance with the illustrative embodiment a storage operating system executing on a storage appliance includes a novel NRV protocol module that implements the NRV protocol. The NRV protocol module interfaces with the file system to provide remote retrieval of data from a backing store. The NRV protocol illustratively utilizes the TCP/IP protocol as a transport protocol. The NRV protocol module is invoked by an exemplary Load_Block() function within a file system that determines whether a block is to be retrieved from the remote backing store. If so, the Load_Block() function initiates a series of NRV protocol requests to the backing store to retrieve the data.

The NRV protocol module first authenticates the connection and then transmits an initialization request to match the appropriate information required at the beginning of the connection. Once the NRV protocol connection has been initialized and authenticated, various types of data may be retrieved from the backing store including, for example, information relating to volumes, blocks and files or other data containers stored on the backing store. Additionally, the NRV protocol provides a mechanism to remotely lock a PCPI (a lock PCPI request) on the backing store so that the backing store does not modify or delete the PCPI until it is unlocked via an unlock command (an unlock PCPI request) sent via the NRV protocol. Such locking may be utilized when the backing store is instantiated within a PCPI that is required for a long-lived the application on the storage appliance, such as a restore on demand application. The novel NRV protocol also includes commands for retrieving status information such as volume information, from the backing store. This may be accomplished by sending a VOLINFO request to the backing store identifying the particular volume of interest.

The present invention provides a NRV protocol that provides several noted advantages over using conventional open protocols. One noted advantage is the transparency of operations. Existing open protocols such as the network file system protocol (NFS) do not expose side effects file system operations, such as that generated a rename operation, which implicitly deletes a target file. Conventional protocols do not inform a client that the file handle of the file that has been deleted. However, certain applications of the NRV protocol, such as that described in United States Patent Publication No. 2007/0250552, entitled Proxy File System, by Jason Lango, or other file caching mechanisms is interested in such information to ensure that cache contents can be invalidated at the appropriate times. A second noted advantage is that the novel NRV protocol of the present invention exposes file system metadata. Conventional protocols, such as NFS. do not expose file system-specific metadata, but rather normalizes the information into a standard format, which may be lossy in that it does not convey some file system specific information. In one alternate embodiment of the present invention, certain features of the NRV protocol may be implemented using a conventional open protocol coupled with an extension protocol that provides the desired functionality necessary for implementing sparse volumes. In such an environment, an open protocol, such as the NFS protocol would be coupled to the NRV protocol. In such an environment the NRV 295 would be configured to utilize the NFS protocol for certain file system operations directed to a backing store.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A first storage system that supports remote retrieval of data, comprising:
    a storage operating system executed by a processor, the storage operating system configured to generate a sparse volume, wherein the sparse volume comprises a space reserved data container with an appearance that a full restore was completed, the storage operating system further configured to mark a block pointer of the sparse volume with a value to identify that a block of the sparse volume is not stored on the first storage system and further configured to retrieve the data of the block at a later time than initialization of the sparse volume using a protocol configured for remote retrieval of the data of the block from a backing store, wherein the backing store is a second storage system that stores backup data and is separate from the first storage system; and
    a protocol module operatively interconnected with the storage operating system and implementing the protocol configured for remote retrieval of the data of the block from the backing store in response to a determination that the block pointer of the sparse volume has the value, the protocol module further configured to return the data of the block to the sparse volume once the data of the block has been retrieved from the backing store.

2. The first storage system of claim 1 further comprising a function configured to load a block of the storage operating system.

3. The first storage system of claim 1 wherein the protocol utilizes a transport control protocol/internet protocol for a transport layer.

4. The first storage system of claim 1 wherein the protocol comprises a read request and the read request comprises a file handle field, a file block number field and a number of blocks to be read field.

5. The first storage system of claim 1 wherein the protocol comprises an authentication request and the authentication request comprises an application field, a type field and a data field.

6. The first storage system of claim 1 wherein the protocol comprises an authentication response and the authentication response comprises a status field and a data field.

7. The first storage system of claim 1 wherein the protocol comprises a request to lock a persistent consistency point image (PCPI) and the request comprises a storage operating system identifier field and a PCPI name field.

8. The first storage system of claim 1 wherein the protocol comprises an initialize request, wherein the initialize request comprises a protocol version field, an application field, and a byte order field.

9. The first storage system of claim 1 wherein the protocol comprises an initialize response, wherein the initialize response comprises a storage operating system version field and a byte order field.

10. The first storage system of claim 1 wherein the protocol comprises a set of operations that return attributes of a data container prior to an operation of the set of operations and following the operation of a set of operations, wherein the set of operations comprises a remove operation, a rename operation, and a create operation.

11. The first storage system of claim 1 wherein the protocol comprises a read request.

12. The first storage system of claim 1 wherein the protocol comprises an authentication request.

13. The first storage system of claim 1 wherein the protocol comprises an authentication response.

14. The first storage system of claim 1 wherein the protocol comprises a request to lock a persistent consistency point image (PCPI).

15. The first storage system of claim 1 wherein the protocol comprises an initialize request.

16. The first storage system of claim 1 wherein the protocol comprises an initialize response.

17. The first storage system of claim 1 wherein the backing store comprises one or more storage systems.

18. The first storage system of claim 1 wherein the protocol comprises a set of operations that return attributes of a data container prior to an operation of the set of operations and following the operation of the set of operation.

19. The first storage system of claim 18 wherein the set of operations comprises a remove operation.

20. The first storage system of claim 18 wherein the set of operations comprises a rename operation.

21. The first storage system of claim 18 wherein the set of operations comprises a create operation.

22. The system of clam 1 wherein the storage operating system is further configured to assign pointer values to indirect blocks of data retrieved from the backing store and stored locally.

23. The system of claim 1 wherein the protocol module is further configured to provide information to permit caching of data modified on an origin server.

24. The system of claim 1 wherein the protocol module is further configured to couple an open protocol to the protocol module.

25. A method for remotely retrieving data by a first storage system from a backing store using a protocol, comprising:
    generating a sparse volume within the first storage system at a first time, wherein the sparse volume comprises a space reserved data container with an appearance that a full restore was completed;
    initializing the sparse volume to accept data access requests at a second time, wherein the first time is before the second time;
    initializing, at a third time, a connection between the first storage system and the backing store, wherein the backing store is a second storage system that stores a backup copy of the data and is separate from the first storage system and the second time is before the third time;
    marking a block pointer of the sparse volume with a value to identify that a block of the sparse volume is not stored on the first storage system;
    sending, in response to a determination that the block pointer of the sparse volume has the value, one or more data access requests to the backing store to retrieve data of the block not stored on the first storage system;

in response to the one or more data access requests, retrieving the data of the block from the backing store;

sending one or more data access responses to the first storage system, where the one or more data access responses comprise the data of the block; and storing the data of the block in the sparse volume within the first storage system.

26. The method of claim 25 further comprising sending a lock PCPI command to the first storage system.

27. The method of claim 25 wherein initializing the connection between the first storage system and the backing store further comprises:
   (a) sending an authentication request to the backing store;
   (b) sending an authentication response to the first storage system by the backing store;
   (c) repeating steps (a)-(b) until a connection is authenticated;
   (d) sending an initialization request to the backing store; and
   (e) sending an initialization response to the first storage system.

28. A computer readable storage medium storing executable program instructions executed by a processor, comprising:
   program instructions that generate a sparse volume within a first storage system, wherein the sparse volume comprises a space reserved data container with an appearance that a full restore was completed;
   program instructions that initialize the sparse volume to accept data access requests at a second time, wherein the first time is before the second time;
   program instructions that initialize at a third time, a connection between the first storage system and a backing store, wherein the backing store is a second storage system that stores a backup copy of the data and is separate from the first storage system and the second time is before the third time;
   program instructions that mark a block pointer of the sparse volume with a value to identify that a block of the sparse volume is not stored on the first storage system;
   program instructions that send, in response to a determination that the block pointer of the sparse volume has the value, one or more data access requests to the backing store to retrieve data of the block not stored on the first storage system;
   in response to the one or more data access requests, program instructions that retrieve the data of the block from the backing store;
   program instructions that send one or more data access responses to the first storage system, wherein the one or more data access responses comprise the data of the block; and
   program instructions that store the data of the block in the sparse volume within the first storage system.

29. The computer readable storage medium of claim 28 wherein initializing the connection between the first storage system and the backing store further comprises:
   (a) sending an authentication request to the backing store;
   (b) sending an authentication response to the first storage system by the backing store;
   (c) repeating steps (a)-(b) until a connection is authenticated;
   (d) sending an initialization request to the backing store; and
   (e) sending an initialization response to the first storage system.

30. A method, comprising:
   generating a sparse volume within a first storage system at a first time, wherein the sparse volume comprises a space reserved data container with an appearance that a full restore was completed;
   marking a block pointer of the sparse volume with a value to identify that one or more blocks of the sparse volume are not stored on the first storage system:
   initializing the sparse volume to accept data access requests at a second time, wherein the first time is before the second time;
   identifying, at a third time, the one or more data blocks to retrieve from the second storage system, wherein the second time is before the third time;
   initializing a connection between the first storage system and the second storage system, wherein the second storage system stores a backup copy of data stored on the first storage system and is separate from the first storage system;
   retrieving the one or more data blocks not stored on the first storage system from the second storage system in response to a determination that the block pointer of the sparse volume has the value; and
   storing the one or more data blocks in the sparse volume within the first storage system.

31. A computer data storage system, comprising:
   a first storage system configured with a file system executed by a processor, the file system configured to create a sparse volume, wherein the sparse volume comprises a space reserved data container with an appearance that a full restore was completed;
   a backing store configured to store a backup copy of data stored on the first storage system, wherein the backing store is a second separate storage system located in a different location than the first storage system;
   the file system further configured to mark a block pointer of the sparse volume with a value to identify, at a later time than creating the sparse volume, one or more blocks of data that are not stored on the first storage system, the file system further configured to retrieve the data using a protocol, wherein the protocol is configured to remotely retrieve the one or more blocks of data from the backing store; and
   a protocol module operatively interconnected with the file system and implementing the protocol configured for remote retrieval of the one or more blocks of data from the backing store in response to a determination that the block pointer of the sparse volume has the value, the protocol module further configured to return the one or more blocks of data to the sparse volume once the one or more blocks of data have been retrieved from the backing store.

32. A computer data storage system, comprising:
   a first storage system configured with a plurality of storage devices organized to form an aggregate and a plurality of virtual volumes stored within the aggregate;
   a backing store configured to store a backup copy of data stored on the first storage system;
   an operating system executed by a processor of the first storage system, the operating system configured to generate a sparse volume and allow data access requests to the sparse volume, wherein the sparse volume comprises a space reserved data container with an appearance that a full restore was completed, wherein the operating system is further configured to mark a block pointer of the sparse volume with a value to identify that a block of the sparse volume is not stored on the first storage system; and a protocol module operatively interconnected with the operating system and implementing the protocol configured for remote retrieval of block data from the backing store at a later time than generating the sparse volume, in response to a determination that the block pointer of the sparse volume has the value, the protocol module further configured to return the block data to the sparse volume once the block data has been retrieved from the backing store.

* * * * *

UNITED STATES PATENT AND TRADEMARK OFFICE
CERTIFICATE OF CORRECTION

PATENT NO. : 7,689,609 B2
APPLICATION NO. : 11/409624
DATED : March 30, 2010
INVENTOR(S) : Jason Ansel Lango et al.

Page 1 of 1

It is certified that error appears in the above-identified patent and that said Letters Patent is hereby corrected as shown below:

In the Specification

In col. 17, line 12 should read:
vvol. Finally, an indirect block or ~~mode~~ inode file parent of the In col. 17, line 17 should read:
indirect block or ~~mode~~ inode as block pointers.

In col. 24, line 58 should read:
a created pre/post attributes field 3415 and, in ~~is~~ alternate Signed and Sealed this
Third Day of December, 2013

Margaret A. Focarino
*Commissioner for Patents of the United States Patent and Trademark Office*